(12) United States Patent
Hamai

(10) Patent No.: US 8,654,756 B2
(45) Date of Patent: Feb. 18, 2014

(54) TRANSMISSION DEVICE, RECEPTION DEVICE, TRANSMISSION METHOD, RECEPTION METHOD, AND TRANSMISSION/RECEPTION SYSTEM

(75) Inventor: Shinji Hamai, Osaka (JP)

(73) Assignee: Panasonic Corporation, Osaka (JP)

( * ) Notice: Subject to any disclaimer, the term of this patent is extended or adjusted under 35 U.S.C. 154(b) by 331 days.

(21) Appl. No.: 13/054,573

(22) PCT Filed: Jul. 17, 2009

(86) PCT No.: PCT/JP2009/003376
§ 371 (c)(1),
(2), (4) Date: Jan. 18, 2011

(87) PCT Pub. No.: WO2010/007798
PCT Pub. Date: Jan. 21, 2010

(65) Prior Publication Data
US 2011/0116502 A1    May 19, 2011

(30) Foreign Application Priority Data

Jul. 18, 2008   (JP) ................................. 2008-187810

(51) Int. Cl.
*H04J 3/06*        (2006.01)
(52) U.S. Cl.
USPC ............................ 370/350; 370/503; 455/502
(58) Field of Classification Search
USPC ................. 370/326, 331, 350, 394, 503, 506;
455/39, 500, 502, 507, 517, 436, 442
See application file for complete search history.

(56) References Cited

U.S. PATENT DOCUMENTS 5,497,330 A    3/1996  Ishida
5,943,328 A *  8/1999  Hosford ........................ 370/331
(Continued)

FOREIGN PATENT DOCUMENTS

| JP | 05-153162 | 6/1993 |
|---|---|---|
| JP | 5-252576 | 9/1993 |

(Continued)

OTHER PUBLICATIONS

English version of D.W. Davies et al., "Network Security", 1st edition, 1st print, Nikkei Magunouhiru-Sha, Dec. 5, 1985, pp. 126 to 132, Ango, DES, Digital Shomei, EFT.

(Continued)

*Primary Examiner* — Hassan Phillips
*Assistant Examiner* — Ajay Cattungal
(74) *Attorney, Agent, or Firm* — Wenderoth, Lind & Ponack, L.L.P.

(57) ABSTRACT

A transmission device, which continues consistent secure communication, even if a frame counter is reset due to a power cut off, includes a transmission frame counter that counts a value monotonically incremented for each packet transmission and holds the value as a frame counter value. The transmission device includes a transmission unit that adds the frame counter value held in the transmission frame counter to a packet, and transmits the packet to the reception device, and a storage circuit that stores the frame counter value. The transmission frame counter (i) stores the counted and held frame counter value into the storage circuit for each stored-frame-counter updating increment that is a natural number greater than an increment by which the frame counter value is monotonically incremented, and holds, as a new frame counter value, the stored frame counter value added with the stored-frame-counter updating increment, when the transmission device is reset.

18 Claims, 12 Drawing Sheets

(56) References Cited

U.S. PATENT DOCUMENTS

| | | | |
|---|---|---|---|
| 6,367,014 B1 | 4/2002 | Proust et al. | |
| 6,678,760 B2 | 1/2004 | Brief | |
| 7,930,543 B2 | 4/2011 | Corndorf | |
| 7,940,933 B2 | 5/2011 | Corndorf | |
| 8,102,999 B2 | 1/2012 | Corndorf | |
| 8,190,900 B2 | 5/2012 | Corndorf | |
| 8,281,408 B2 | 10/2012 | Corndorf | |
| 2002/0159444 A1 | 10/2002 | Vialen et al. | |
| 2004/0017774 A1* | 1/2004 | Tapie et al. | 370/235 |
| 2005/0204140 A1 | 9/2005 | Maruyama et al. | |
| 2006/0048181 A1* | 3/2006 | Kim et al. | 725/37 |
| 2006/0062188 A1 | 3/2006 | Nyberg et al. | |
| 2008/0044014 A1 | 2/2008 | Corndorf | |
| 2008/0044025 A1 | 2/2008 | Corndorf | |
| 2008/0046039 A1 | 2/2008 | Corndorf | |
| 2008/0232589 A1* | 9/2008 | Chamberlain et al. | 380/275 |
| 2009/0052674 A1* | 2/2009 | Nishida et al. | 380/278 |
| 2009/0074083 A1 | 3/2009 | Wakutsu | |
| 2009/0102682 A1 | 4/2009 | Corndorf | |
| 2010/0188568 A1* | 7/2010 | Abe et al. | 348/441 |
| 2011/0197067 A1 | 8/2011 | Corndorf | |
| 2012/0330380 A1 | 12/2012 | Corndorf | |

FOREIGN PATENT DOCUMENTS

| | | |
|---|---|---|
| JP | 10-320921 | 12/1998 |
| JP | 2000-514625 | 10/2000 |
| JP | 2002-323717 | 8/2002 |
| JP | 2002-323717 | 11/2002 |
| JP | 2005-260676 | 9/2005 |
| JP | 2007-086608 | 4/2007 |
| JP | 2007-158402 | 6/2007 |
| JP | 2007-266875 | 10/2007 |
| JP | 2008-167210 | 7/2008 |
| WO | 2008/021920 | 2/2008 |

OTHER PUBLICATIONS

International Search Report issued Oct. 27, 2009 in International (PCT) Application No. PCT/JP2009/003376.

D.W. Davies et al., "Network Security", 1st edition, 1st print, Nikkei Magunouhiru-Sha, Dec. 5, 1985, pp. 126 to 132, Ango, DES, Digital Shomei, EFT.

IEEE Standard for Information technology—Telecommunications and information exchange between systems—Local and metropolitan area networks—Specific requirement Part 15.4 : Wireless Medium Access Control and Physical Layer Specifications for Low-Rate Wireless Personal Area Networks (IEEE802.15.4).

Extended European Search Report mailed Jul. 18, 2013 for corresponding European Patent Application No. 09797726.8.

"IEEE Standard for Information Technology—Telecommunications and Information Exchange Between Systems—Local and Metropolitan Area Networks—Specific Requirements Part 15.4: Wireless Medium Access Control (MAC) and Physical Layer (PHY) Specifications for Low-Rate Wireless Personal Area Networks (WPANs)", IEEE Computer Society, Sep. 8, 2006, pp. 198-212.

"IEEE Standard for Information Technology—Telecommunications and Information Exchange Between Systems—Local and Metropolitan Area Networks—Specific Requirements Part 15.4: Wireless Medium Access Control (MAC) and Physical Layer (PHY) Specifications for Low-Rate Wireless Personal Area Networks", IEEE Computer Society, Aug. 31, 2007, pp. 1-203.

* cited by examiner

FIG. 4
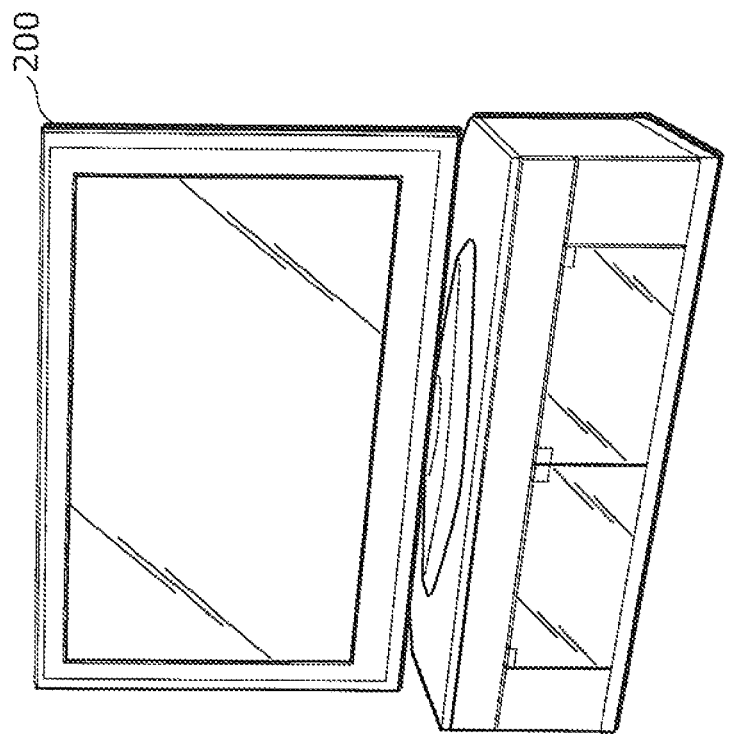
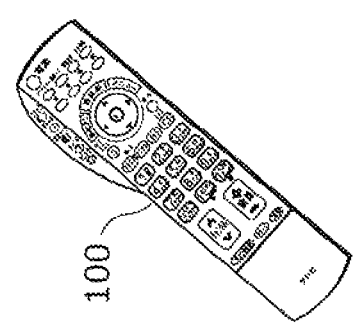

TRANSMISSION DEVICE, RECEPTION DEVICE, TRANSMISSION METHOD, RECEPTION METHOD, AND TRANSMISSION/RECEPTION SYSTEM

TECHNICAL FIELD

The present invention relates to transmission devices, reception devices, transmission methods, reception methods, and transmission/reception systems.

BACKGROUND ART

In recent years, television sets (hereinafter, referred to as "TVs") having Internet Protocol Television (IPTV) functions have been appeared. The IPTV is the provision of services such as shopping and Video on Demand (VOD) to users over the Internet using the Internet technologies. Some of the services such as shopping and VOD require entry of a credit card number of a user for payment, or entry of a name, an address, a telephone number, etc. of a user for user registration or delivery. Such data entry is performed using a control device (transmission device) such as a remote controller.

Control devices so-called remote controllers which control controlled devices such as TVs conventionally use infrared ray to send commands to control the controlled devices. Recently, control devices (remote controllers) are considered to use radio waves to wirelessly transmit commands to control the controlled devices.

However, wireless transmission (radio waves) does not generally have directionality. For example, radio waves in wireless communication using IEEE 802.15.4 standard travel a distance ranging from 10 m to 100 m. That is, wireless transmission (radio waves) would be easily transmitted from a user's house to an area where a third party is present. This allows a malicious third party to do packet tapping, packet tampering, or replay attack.

More specifically, the use of such a remote controller employing wireless transmission has the following concerns about security. Packet tapping would cause leakage of private information of a viewer of the controlled device, such as a name, an address, a telephone number, and a credit card number. Packet tapping would also cause reveal of viewer's preference by analyzing a program viewed by the viewer. Packet tampering would cause manipulation of a power source or channels of a TV controlled by a viewer, or would cause unintended shopping. Even if packet tampering is impossible, attack means called a replay attack would enable the unauthorized manipulation of a power source or channels of the TV of the viewer, or repetition of past shopping.

In order to avoid the above-described security concerns, IEEE 802.15.4 standardized in Non-Patent Reference 1, for example, offers secure communication using the following functions. 1) A payload is encrypted to prevent packet tapping. 2) A Message Integrity Code (MIC) is added to a packet to distinguish the packet if tampered, thereby preventing packet tampering. 3) A frame counter incremented for each packet transmission is used to prevent replay attacks. The Message Integrity Code (MIC) is a system assuring integrity of a message.

FIG. 1 is a diagram of packet structures. FIG. 2 is a schematic diagram of packet structures. Each of FIGS. 1 and 2 illustrates a structure of a plain text packet 101 using IEEE 802.15.4, and a structure of a secure packet 102 generated by applying the above-described functions to the plain text packet 101.

The plain text packet 101 illustrated in FIG. 1 includes a Frame Control 111, an address 112, a payload 113, and a Frame Check Sequence (FCS) 114. An example of the plain text packet 101 is a pairing request packet including a pairing request, or a pairing response packet including a pairing response indicating a response to the pairing request. FIG. 2 schematically illustrates a portion related to the above-described functions in the plain text packet 101. In other words, the plain text packet 101 illustrated in FIG. 2 includes the payload 113.

The secure packet 102 illustrated in FIG. 1 includes a frame control 121, an address 122, a frame counter (FC) 123, a Key Sequence Counter (KSC) 124, an encrypted payload 125, a MIC 126, and a FCS 127. An example of the secure packet 102 is a command packet including a command. FIG. 2 schematically illustrates a portion related to the above-described functions in the secure packet 102. In short, the secure packet 102 illustrated in FIG. 2 includes the frame counter 123, the encrypted payload 125, and the MIC 126.

Each of the frame control 111 and the frame control 121 is a header indicating a structure of the corresponding packet. The frame control 111 includes information of a plain text packet. The frame control 121 includes information of a secure packet.

Each of the addresses 112 and 122 is a field in which a destination address and a source address are indicated.

The payload 113 is data to be transmitted. An example of the payload 113 is data indicating a pairing request included in a pairing request packet, or data indicating a pairing response included in a pairing response packet.

Each of the FCS 114 and the FCS 127 is one of error detection methods using a checksum for error detection. They are data used to check errors such as data transformation. More specifically, the FCS 114 is a Cyclic Redundancy Check (CRC) for the frame control 111, the address 112, and the payload 113. Here, the CRC is one of error detection methods for detecting a series of errors. Likewise, the FCS 127 is a CRC for the frame control 121, the address 122, the frame counter 123, the KSC 124, the encrypted payload 125, and the MIC 126.

The frame counter 123 is a counter monotonically incremented for every packet transmission. More specifically, the frame counter 123 has a counter value that is incremented by 1 for each transmitted packet.

The KSC 124 is a counter monotonically incremented for every key updating.

The encrypted payload 125 is generated by encrypting the payload 113. An example of the encrypted payload 125 is data indicating a command included in a command packet.

The MIC 126 is data generated by performing an operation using the frame control 121, the address 112, the frame counter 123, the KSC 124, the encrypted payload 125, and the key. The MIC 126 is used to check tampering. The MIC 126 has a length of 4 bytes at minimum.

Thus, the plain text packet 101 and the secure packet 102 have the above-described structures.

Next, the description is given for the situation where communication is performed using the plain text packet 101 and the secure packet 102 between a TV as the controlled device and a remote controller as the control device.

More specifically, the plain text packet 101 and the secure packet 102 are used in the following manner. It is assumed in the following description that a remote controller transmits data (as the transmission device) and a TV receives the data (as the reception device).

First, the remote controller serving as the transmission device and the TV serving as the reception device performs processing called pairing using the plain text packet 101. The pairing includes, for example, address exchange, function confirmation, device verification, key sharing, and the like. It should be noted that the processing performed by the remote controller and the TV is not limited to the pairing as long as the remote controller and the TV can exchange a key used in the secure packet 102.

Next, the remote controller transmits the secure packet 102 to the TV. The secure packet 102 includes the encrypted payload 125 in which a command for controlling the TV is indicated.

This command, by which the remote controller controls the TV, is encrypted using a key and added as the encrypted payload 125 into the secure packet 102. Therefore, a third party who does not know the key cannot decrypt the encrypted command. As a result, it is possible to prevent a third party from tapping the command.

In addition, the MIC 126 in the secure packet 102 includes information (a hash value, for example) indicating the encrypted payload 125. The information is generated by performing an operation using a key shared between the transmission device and the reception device. Therefore, it is difficult for a third party who does not know the key to perform the operation correctly. Moreover, since the MIC 126 has a length of 4 bytes at minimum, even so-called Brute Force Attack needs $2^{31}$ tries, namely two billion tries in average to perform the operation correctly, which is not practical. This means that the MIC 126 makes difficult for a third party to perform correct operation. Therefore, the MIC 126 is useful for checking tampering.

Furthermore, the frame counter 123 in the secure packet 102 indicates a value of a counter which is incremented by 1 for each packet transmission. The reception device stores, as a value of a current reception frame counter, the value of the frame counter 123 included in a packet that has been received without error. If a value of a frame counter 123 in a currently received packet is equal to or smaller than the value of the current reception frame counter which is stored in the reception device, the reception device discards the currently received packet. Thereby, the reception device can avoid re-receiving of a packet that has already been received. As a result, it is possible to prevent a replay attack by which a third party obtains a packet transmitted using a remote controller by a viewer who is a true user and then re-transmits the obtained packet.

As described above, the conventional method ensures security of packets transmitted from the transmission device to the reception device. In other words, the conventional technology can transmit the secure packet 102 from the transmission device to the reception device in the above-described manner.

PRIOR ART(S)

Non-Patent Reference

Non-Patent Reference 1: IEEE Standard for Information technology—Telecommunications and information exchange between systems—Local and metropolitan area networks—Specific requirement Part 15.4: Wireless Medium Access Control and Physical Layer Specifications for Low-Rate Wireless Personal Area Networks (IEEE 802.15.4)

DISCLOSURE OF INVENTION

Problems that Invention is to Solve

However, the transmission device and the reception device such as a remote controller and a TV, for which a high-speed response is required, have the following problem.

The conventional method cannot keep a consistency between the frame counter of the transmission device and the frame counter of the reception device, when the value of the frame counter 123 held in the remote controller serving as the transmission device is cleared (reset) due to battery exchange in the remote controller, for example, or when the value of the current reception frame counter held in the TV serving as the reception device is cleared (reset) due to power cut off of a main power of the TV, for example. In the above situation, the reception device cannot receive any packets from the transmission device, so that the pairing (key exchange) should be performed again between the reception device and the transmission device to resume communication. In general, the pairing is bothersome, requiring intervention of a user to verify these devices. In other words, for the transmission device and the reception device for which a high-speed response is required, it is inconvenient and impractical to resume the processing again from the key exchange.

The following describes the situation where the transmission device is reset and a consistency between the frame counters of the devices is therefore lost, with reference to FIG. 3. Referring to FIG. 3, in the transmission device, a value of the frame counter 123 is incremented by 1 every time a packet is transmitted (S11 to S18). On the other hand, in the reception device side, if a value of the frame counter 123 which is indicated in a received packet is greater than the value of the current reception frame counter, the reception device accepts the received packet and updates the value of the current reception frame counter to the received value (S31 to S34).

Here, it is assumed that the transmission device is reset and therefore the value of the frame counter of the transmission device is cleared to be 0 (S19). Therefore, a value of the frame counter which is indicated in a next packet transmitted from the transmission device to the reception device is 0. Since the value of the frame counter 123 which is indicated in the received packet is smaller than the value of the current reception frame counter, the reception device discards the received packet and the reception device becomes unable to receive any packets from the transmission device.

There is another method of storing the value of the frame counters of the devices into a nonvolatile memory such as an Electrically Erasable Programmable Read Only Memory (EEPROM), so that the values are not reset even if a battery of the remote controller is exchanged or the main power of the TV is powered OFF.

However, an EEPROM generally has a rewritable life expectancy. If a value of the frame counter is updated and stored into an EEPROM for each packet, the EEPROM soon lives out the life and becomes unable to operation within three years, for example.

Thus, the present invention addresses the above-described problems. An object of the present invention is to provide a transmission device, a reception device, a transmission method, a reception method, and a transmission/reception system, each of which is capable of continuing secure communication having a consistency between a frame counter of the transmission device and a frame counter of the reception device without bothering a user, even if the frame counter is reset due to battery exchange, power cut off, or the like.

Means to Solve the Problems

In accordance with an aspect of the present invention for solving the above problems, there is provided a transmission device which transmits a packet to a reception device, the transmission device including: a transmission frame counter unit configured to count a value monotonically incremented for each packet transmission and hold the value as a frame counter value; a transmission unit configured to add the frame counter value held in the transmission frame counter unit to a packet, and transmit the packet to the reception device; and a storage unit configured to store the frame counter value, wherein the transmission frame counter unit is further configured to (i) store the frame counter value counted and held in the transmission frame counter unit into the storage unit for each stored-frame-counter updating increment, the stored-frame-counter updating increment being a natural number greater than an increment by which the frame counter value is monotonically incremented, and (ii) hold, as a new frame counter value, the frame counter value stored in the storage unit added with the stored-frame-counter updating increment, when the transmission device is reset.

With the above structure, even if the transmission device is reset due to battery exchange, power cut off, or the like so that the frame counter value held in the transmission frame counter unit is lost (cleared), the transmission device can continue secure communication with the reception device, keeping a consistency with the frame counter of the reception device, without bothering a user. In addition, the frame counter value is stored into the storage unit for each stored-frame-counter updating increment, not for each packet transmission. As a result, it is possible to decrease the number of processes for writing to the storage unit.

The storage unit may be a nonvolatile memory.

With the above structure, the frame counter value is stored into the nonvolatile memory for each stored-frame-counter updating increment, not for each packet transmission. Thereby, it is possible to decrease the number of processes for writing to the non-volatile memory, thereby extending the life of the nonvolatile memory. As a result, a practical life of the nonvolatile memory can be provided.

In accordance with another aspect of the present invention for solving the above problems, there is provided a reception device including: a reception unit configured to receive a packet; a frame counter check unit configured to check a frame counter value included in the packet received by the reception unit so as to determine whether or not the frame counter value is valid; a reception frame counter unit configured to hold the frame counter value determined by the frame counter check unit as being valid; and a reception frame counter storage unit configured to store, by each predetermined increment, the frame counter value determined as being valid, wherein the frame counter check unit is configured to determine that the frame counter value included in the packet received by the reception unit is valid, when the frame counter value included in the packet is greater than the frame counter value stored in the reception frame counter storage unit.

In accordance with still another aspect of the present invention for solving the above problems, there is provided a transmission and reception system including a transmission device and a reception device, wherein the transmission device includes: a transmission frame counter unit configured to count a value monotonically incremented for each packet transmission and hold the value as a frame counter value; a transmission unit configured to add the frame counter value held in the transmission frame counter unit to a packet, and transmit the packet to the reception device; and a storage unit configured to store the frame counter value, wherein the transmission frame counter unit is further configured to (i) store the frame counter value counted and held in the transmission frame counter unit into the storage unit for each stored-frame-counter updating increment, the stored-frame-counter updating increment being a natural number greater than an increment by which the frame counter value is monotonically incremented, and (ii) hold, as a new frame counter value, the frame counter value stored in the storage unit added with the stored-frame-counter updating increment, when the transmission device is reset, and wherein the reception device includes: a reception unit configured to receive the packet transmitted from the transmission device; a frame counter check unit configured to check a frame counter value included in the packet received by the reception unit so as to determine whether or not the frame counter value is valid; a reception frame counter unit configured to hold the frame counter value determined by the frame counter check unit as being valid; and a reception frame counter storage unit configured to store, by each predetermined increment, the frame counter value determined as being valid, wherein the frame counter check unit is configured to determine that the frame counter value included in the packet received by the reception unit is valid, when the frame counter value included in the packet is greater than the frame counter value stored in the reception frame counter storage unit.

The transmission device may be a television, and the reception device may be a remote controller.

It should be noted that the present invention can be implemented not only as the above-described device, but also as: a method including steps performed by the processing units included in the device: a program causing a computer to execute the steps; a computer-readable recording medium, such as a Compact Disc-Read Only Memory (CD-ROM), on which the program is recorded; m information, data, signals indicating the program; and the like. The program, information, data, and signals can be distributed by a communication network such as the Internet.

Effects of the Invention

The present invention can provide a transmission device, a reception device, a transmission method, a reception method, and a transmission/reception system, each of which is capable of continuing secure communication having a consistency between a frame counter of the transmission device and a frame counter of the reception device without bothering a user, even if the frame counter is reset due to battery exchange, power cut off, or the like.

BRIEF DESCRIPTION OF DRAWINGS

FIG. 4 is an external view of an example of a transmission/reception system according to an embodiment of the present invention.

BEST MODE FOR CARRYING OUT THE INVENTION

First Embodiment

FIG. 4 is an external view of an example of a transmission/reception system according to an aspect of the present invention.

The transmission/reception system illustrated in FIG. 4 includes a transmission device 100 and a reception device 200. An example of the transmission device 100 is a remote controller. An example of the reception device 200 is a TV.

The transmission device 100, such as a remote controller, exchanges a key with the reception device 200 using a method such as pairing. Then, the transmission device 100 generates a command using the key, and transmits a secure packet 102 including the command to the reception device 200 via radio waves. Thereby, the transmission device 100 controls the reception device 200.

The reception device 200, such as a TV, performs the above-described key exchange with the transmission device 100 using a method such as pairing. Then, the reception device 200 receives, from the transmission device 100, the secure packet 102 including the command which is transmitted via radio waves. Thereby, the reception device 200 performs processing according to the command. In the above-described manner, the reception device 200 is controlled by the transmission device 100.

As described above, the transmission/reception system according to the aspect of the present invention includes the transmission device 100 and the reception device 200.

Figure 1:
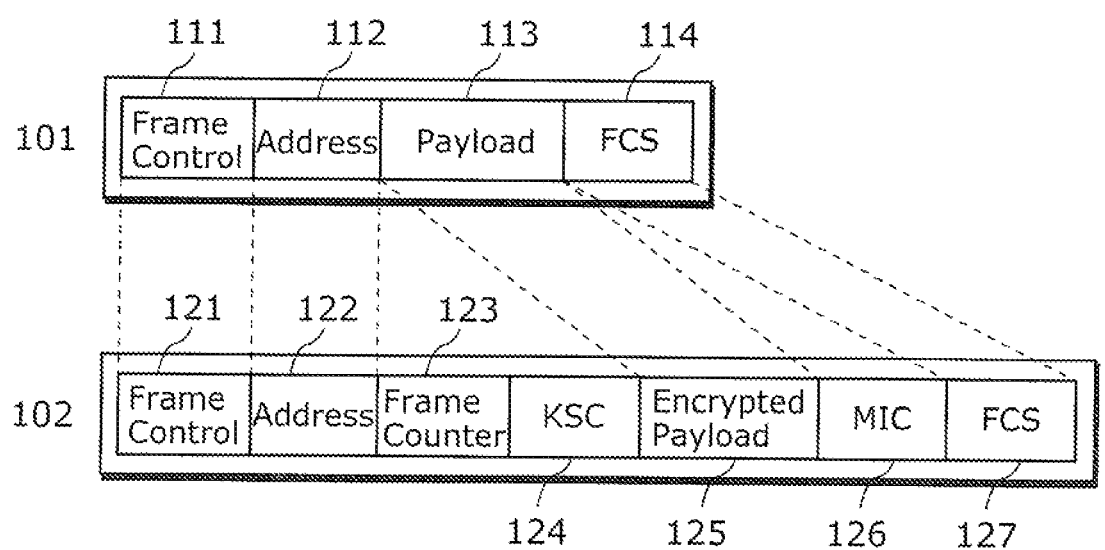
FIG. 1 is a diagram of packet structures.
Figure 2:
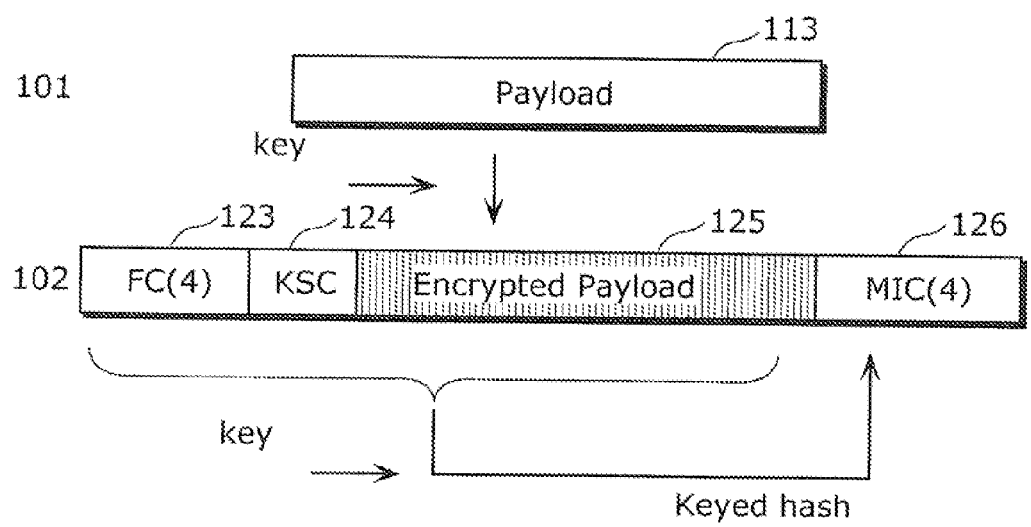
FIG. 2 is a schematic diagram of packet structures.
Figure 3:
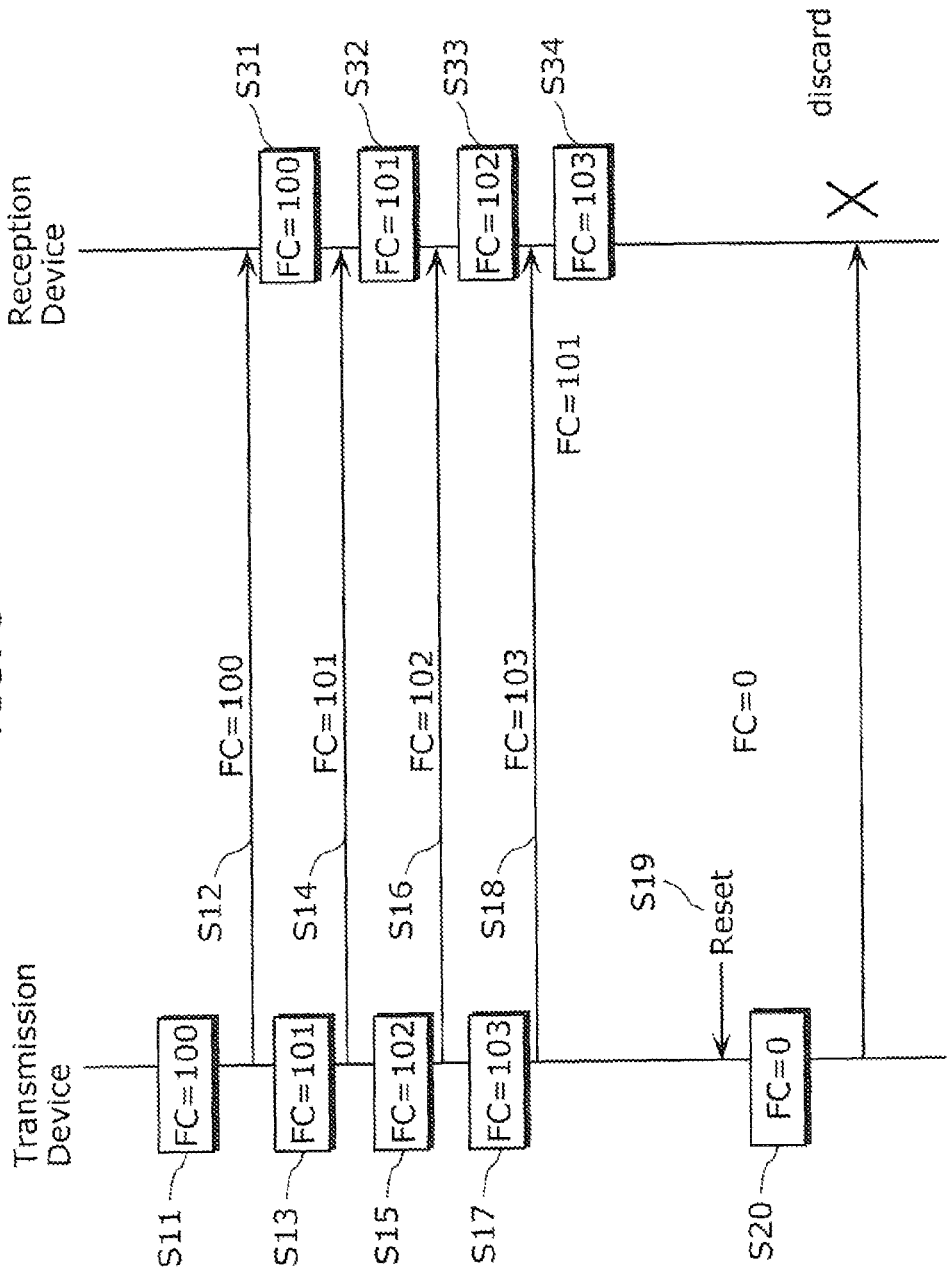
FIG. 3 is a sequence diagram for explaining a problem of a conventional method.
Figure 5:
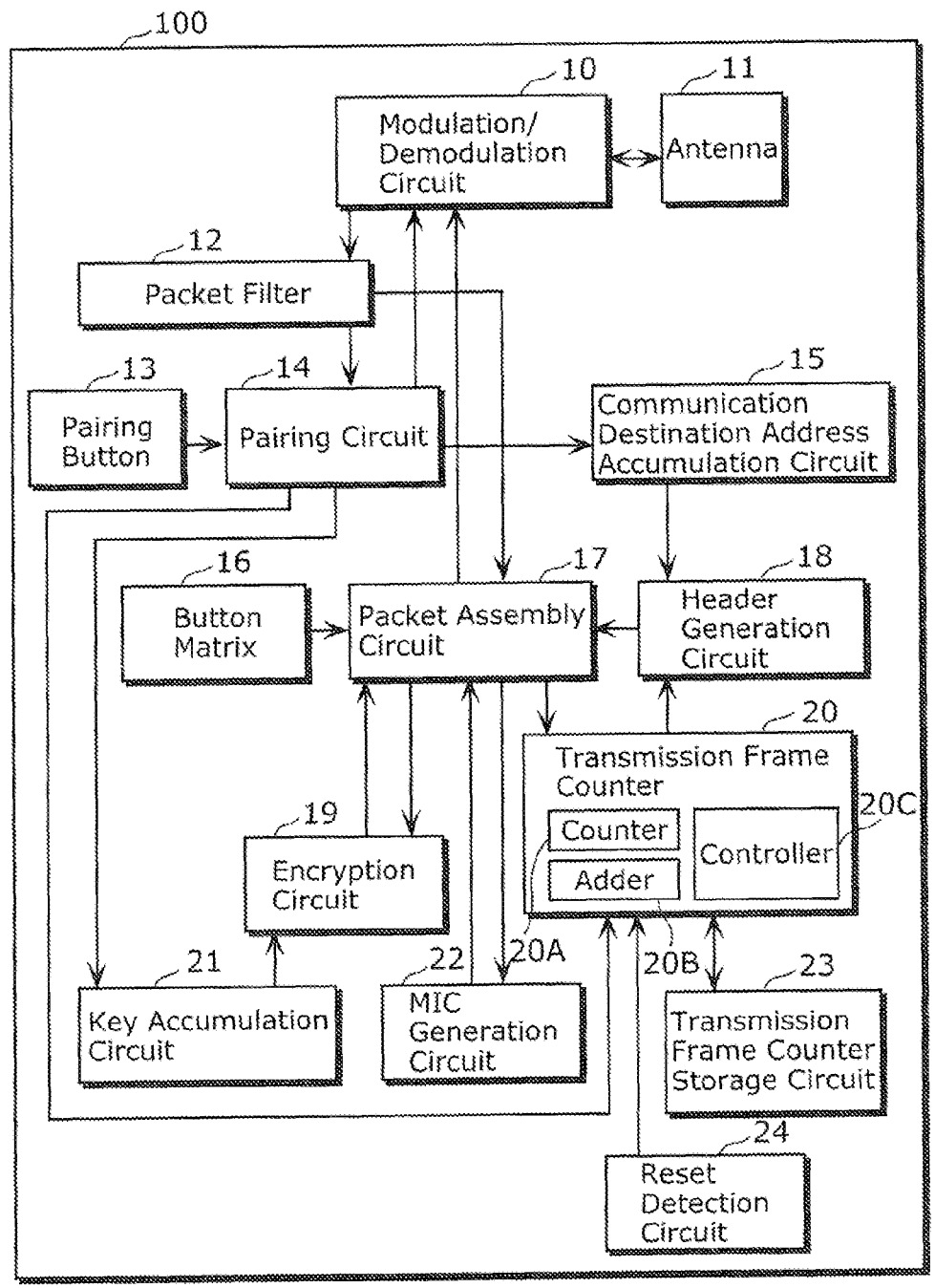
FIG. 5 is a block diagram of a structure of a transmission device according to a first embodiment of the present invention.
Figure 6:
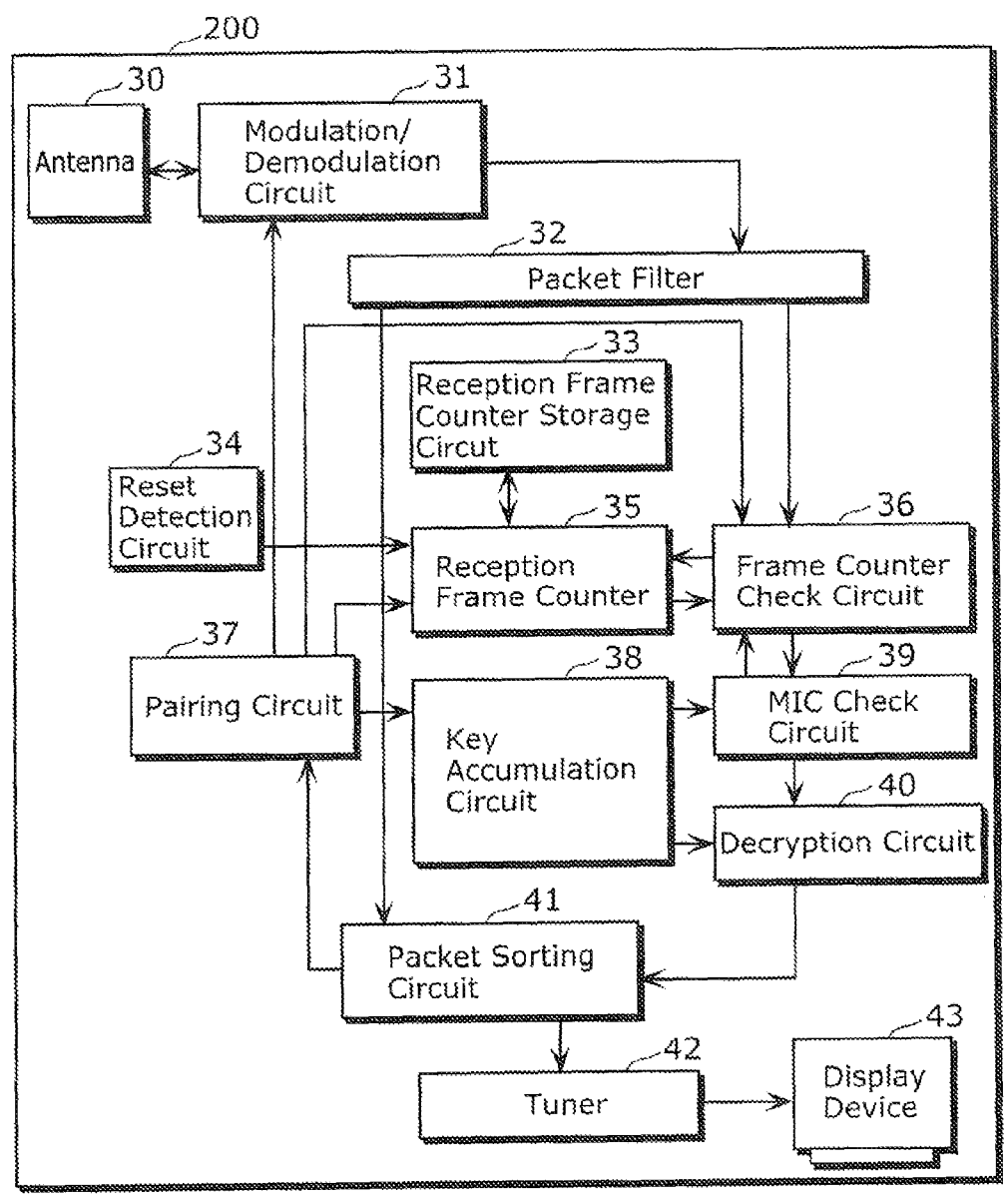
FIG. 6 is a block diagram of a structure of a reception device according to the first embodiment of the present invention.

FIG. 5 is a block diagram of a structure of the transmission device according to the first embodiment of the present invention. FIG. 6 is a block diagram of a structure of the reception device according to the first embodiment of the present invention.

The transmission device 100 illustrated in FIG. 5, which is a remote controller or the like, includes a modulation/demodulation circuit 10, an antenna 11, a packet filter 12, a pairing button 13, a pairing circuit 14, a communication destination address accumulation circuit 15, a button matrix 16, a packet assembly circuit 17, a header generation circuit 18, an encryption circuit 19, a transmission frame counter 20, a key accumulation circuit 21, a MIC generation circuit 22, a transmission frame counter storage circuit 23, and a reset detection circuit 24.

On the other hand, the reception device 200 illustrated in FIG. 6, which is a TV or the like, includes an antenna 30, a modulation/demodulation circuit 31, a packet filter 32, a reception frame counter storage circuit 33, a reset detection circuit 34, a reception frame counter 35, a frame counter check circuit 36, a pairing circuit 37, a key accumulation circuit 38, a MIC check circuit 39, a decryption circuit 40, a packet sorting circuit 41, a tuner 42, and a display device 43.

First, the structure of the transmission device 100 is described.

The modulation/demodulation circuit 10 modulates an input packet, and provides resulting modulated signals to the antenna 11. In addition, the modulation/demodulation circuit 10 receives modulated signals from the antenna 11, then re-converts (demodulates) the received modulated signals into a packet, and provides the resulting packet to the packet filter 12.

The antenna 11 converts the modulated signals, which have been modulated in and provided from the modulation/demodulation circuit 10, into radio waves, and transmits the radio waves to the reception device 200. In addition, the antenna 11 receives radio waves from the reception device 200, then converts the received radio waves into modulated signals, and provides the resulting modulated signals to the modulation/demodulation circuit 10.

The packet filter 12 receives a packet from the modulation/demodulation circuit 10. When the received packet has a destination address that is not an address of the transmission device 100, the packet filter 12 discards the packet. When the received packet is, for example, a pairing response packet, the packet filter 12 provides the packet to the pairing circuit 14. Furthermore, when the packet filter 12 receives, via the antenna 11 and the modulation/demodulation circuit 10, an acknowledgement packet in response to a packet transmitted from the transmission device 100, the packet filter 12 notifies the reception of the acknowledgement packet to a processing unit that has transmitted the packet. More specifically, when the packet filter 12 receives an acknowledgement packet in response to a pairing request packet, the packet filter 12 notifies the pairing circuit 14 of the receipt of the acknowledgement packet. On the other hand, when the packet filter 12 receives an acknowledgement packet in response to a command packet, the packet filter 12 notifies the packet assembly circuit 17 of the receipt of the acknowledgement packet.

The pairing button 13 is a button used to start pairing. When a user presses the pairing button 13, pairing starts. More specifically, user's pressing of the pairing button 13 causes the pairing button 13 to notify the pairing circuit 14 of that pairing should start.

This pairing start notification triggers the pairing circuit 14 to generate a pairing request packet and provide the generated pairing request packet to the modulation/demodulation circuit 10. In this example, the pairing request packet is a broadcast packet. In receiving a pairing response packet, the pairing circuit 14 accumulates a key included in the pairing response packet into the key accumulation circuit 21, and also accumulates a source address of the pairing response packet into the communication destination address accumulation circuit 15 as a communication destination address. In addition, when the pairing circuit 14 receives the pairing start notification, the pairing circuit 14 resets a value of the transmission frame counter 20 to 0, for example.

The communication destination address accumulation circuit 15 accumulates a communication destination address.

The button matrix 16 is a group of buttons used to control the reception device 200 such as a TV. The buttons in the button matrix 16 are displayed as, for example, characters and/or images respectively representing power supply, channel selection, sound volume adjustment, and the like of the reception device 200. When the user presses one of these buttons, a code unique to the pressed button is provided to the packet assembly circuit 17.

When the packet assembly circuit 17 receives the code unique to the pressed button in the button matrix 16, the packet assembly circuit 17 converts the code into a command and provides the command to the encryption circuit 19. Thereby, the packet assembly circuit 17 receives, from the encryption circuit 19, a command encrypted by the encryption circuit 19. The packet assembly circuit 17 retrieves a packet header from the header generation circuit 18, and then provides the packet header and the command encrypted by the encryption circuit 19, to the MIC generation circuit 22. Thereby, the packet assembly circuit 17 receives, from the MIC generation circuit 22, a MIC generated by the MIC generation circuit 22. The packet assembly circuit 17 therefore assembles the packet header, the command encrypted by the encryption circuit 19, and the MIC generated by the MIC generation circuit 22, into a single packet, and adds a FCS to the assembled packet to eventually generate a command packet. Then, the packet assembly circuit 17 provides the command packet to the modulation/demodulation circuit 10. When receipt of an acknowledgement packet in response to the command packet is notified from the packet filter 12, the packet assembly circuit 17 notifies the transmission frame counter 20 of that transmission of the command packet is successful.

The header generation circuit 18 obtains a communication destination address from the communication destination address accumulation circuit 15, and obtains a frame counter value from the transmission frame counter 20. Then, the header generation circuit 18 generates a packet header from the obtained communication destination address, the obtained frame counter value, and an address of the transmission device 100. The header generation circuit 18 provides the generated packet header to the packet assembly circuit 17.

The encryption circuit 19 receives data such as a command, and encrypts the received data using the key accumulated in the key accumulation circuit 21. The encryption circuit 19 provides the encrypted data (encrypted payload) to the packet assembly circuit 17.

The MIC generation circuit 22 receives, from the packet assembly circuit 17, pieces of data such as the encrypted command and the packet header. The MIC generation circuit 22 generates a MIC using the received pieces of data and the key accumulated in the key accumulation circuit 21, and provides the generated MIC to the packet assembly circuit 17.

The transmission frame counter 20 counts a value that is monotonically incremented for each packet, and holds the value as a frame counter value. The transmission frame counter 20 stores the held frame counter value into a storage unit, every increment for updating the stored frame counter value (hereinafter, a "stored-frame-counter updating increment"). The stored-frame-counter updating increment is a natural number that is greater than an increment for monotonically incrementing the frame counter value held in the transmission frame counter 20. Moreover, when the transmission device is reset, the transmission frame counter 20 adds the value stored in the storage unit with the stored-frame-counter updating increment, to be a new frame counter value to be held. More specifically, the transmission frame counter 20 includes a counter 20A, an adder 20B, and a controller 20C, and provides the frame counter value to the header generation circuit 18. The counter 20A counts and holds the frame counter value that is monotonically incremented for each packet. The controller 20C controls the counter 20A and the adder 20B.

The counter 20A includes a nonvolatile memory such as a register. The counter 20A holds a frame counter value. The counter 20A provides the held frame counter value to the header generation circuit 18. In addition, the counter 20A increments the held frame counter value by 1 every time the packet assembly circuit 17 notifies the transmission frame counter 20 of that transmission of a command packet is successful.

Moreover, the counter 20A sets a frame counter value provided from the adder 20B under the control of the controller 20C. In other words, the counter 20A replaces the held frame counter value by a frame counter value set by the controller 20C.

Furthermore, when the packet assembly circuit 17 notifies the transmission frame counter 20 of that pairing is successful, the counter 20A sets the held frame counter value to be 0.

Regarding the controller 20C, when a difference between (a) a frame counter value that is stored in the transmission frame counter storage circuit 23 and (b) a frame counter value that is currently held in the counter 20A is equal to or greater than W, the controller 20C controls the counter 20A to provide the transmission frame counter storage circuit 23 with the frame counter value held in the counter 20A. In other words, the controller 20C stores a frame counter value incremented by W into the transmission frame counter storage circuit 23, every time the frame counter value held in the counter 20A is incremented by W that is a natural number greater than the increment for monotonically incrementing the frame counter value held in the counter 20A. Here, W is an integer number of 2 or greater. For example, W is 100. In the following description, W represents a stored-frame-counter updating increment.

Furthermore, when the packet assembly circuit 17 notifies the transmission frame counter 20 of that pairing is successful, the controller 20C sets the frame counter value held in the counter 20A to be 0. At the same time, the controller 20C also sets the frame counter value stored in the transmission frame counter storage circuit 23 to be 0. More specifically, the controller 20C controls the transmission frame counter storage circuit 23 to provide the counter 20A with the frame counter value of 0, and to set the frame counter value stored in the transmission frame counter storage circuit 23 to be 0.

When the reset detection circuit 24 notifies the transmission frame counter 20 of that the transmission device 100 is rest, the controller 20C controls the adder 20B to read the frame counter value from the transmission frame counter storage circuit 23. The controller 20C controls the adder 20B to add the readout frame counter value with W, and to provide the resulting value to the counter 20A. Then, the controller 20C controls the counter 20A to set a new frame counter value to be held in the counter 20A as the value outputted by the adder 20B.

The adder 20B is controlled by the controller 20C. When the reset detection circuit 24 notifies the transmission frame counter 20 of that the transmission device 100 is rest, the adder 20B reads the frame counter value from the transmission frame counter storage circuit 23, and adds the readout frame counter value with W. Then, the adder 20B provides the resulting frame counter value to the counter 20A.

The transmission frame counter storage circuit 23 includes a nonvolatile memory. When the transmission frame counter 20 notifies the transmission frame counter storage circuit 23 of the frame counter value, the transmission frame counter storage circuit 23 writes the notified value into the nonvolatile memory. Furthermore, in response to a request, the transmission frame counter storage circuit 23 reads the value from the nonvolatile memory and provides the readout value to the transmission frame counter 20. Here, the transmission frame counter storage circuit 23 needs to hold only the frame counter value notified from the transmission frame counter 20, and does not need to keep any previous values. In this example, data is overwritten or updated to the transmission frame counter storage circuit 23, and thereby the transmission frame counter storage circuit 23 holds only the frame counter value that is notified from the transmission frame counter 20. It is therefore preferable that the transmission frame counter storage circuit 23 is typically a small nonvolatile memory such as a flash memory. Thereby, even if the transmission device 100 is a small device such as a remote controller, the transmission frame counter storage circuit 23 can be embedded in the transmission device 100.

When the reset detection circuit 24 detects reset, the reset detection circuit 24 notifies the reset to the transmission frame counter 20. Here, the reset refers to that setting is forcibly returned to an initial state. In the first embodiment, the reset means that the frame counter value held in the transmission frame counter 20 is lost (cleared). For example, the reset is detected, when the transmission device 100 is powered OFF and resumed due to battery exchange or the like, or when a signal instructing to clear the frame counter value is detected.

The key accumulation circuit 21 accumulates a key provided from the pairing circuit 14.

Thus, the transmission device 100 has the above-described structure.

Next, the structure of the reception device 200 is described.

The modulation/demodulation circuit 31 modulates an input packet, and provides resulting modulated signals to the antenna 30. In addition, the modulation/demodulation circuit 31 receives modulated signals from the antenna 30, then re-converts (demodulates) the modulated signals into a packet, and provides the resulting packet to the packet filter 32.

The antenna 30 converts the modulated signals, which have been modulated in and provided from the modulation/demodulation circuit 31, into radio waves, and transmits the radio waves to the transmission device 100. In addition, the antenna 30 receives radio waves from the transmission device 100, then converts the received radio waves into modulated signals, and provides the resulting modulated signals to the modulation/demodulation circuit 31.

The packet filter 32 receives a packet from the modulation/demodulation circuit 31, and determines whether or not the received packet is to be discarded. For example, if FCS of the received packet is not correct, the packet filter 32 discards the packet. In addition, if a destination address of the received packet is not the address of the reception device 200, or is not a broadcast packet, the packet filter 32 discards the packet. Moreover, if the received packet is not to be discarded and is encrypted, the packet filter 32 provides the encrypted packet to the frame counter check circuit 36. Otherwise, the packet filter 32 provides the received packet to the packet sorting circuit 41.

The reset detection circuit 34 detects reset, and outputs the reset to the reception frame counter 35. In other words, the reset detection circuit 34 informs the reset to the reception frame counter 35, if the reset detection circuit 34 detects reset. Here, the reset refers to that setting is forcibly returned to an initial state. In the first embodiment, the reset means that the frame counter value held in the reception frame counter 35 is lost (cleared). For example, the reset is detected, when the reception device 200 is powered OFF and resumed due to power cut off of main power source or the like, or when a signal instructing to clear the frame counter value is detected.

The reception frame counter storage circuit 33 includes a nonvolatile memory. When the reception frame counter 35 notifies a frame counter value to the reception frame counter storage circuit 33, the reception frame counter storage circuit 33 writes the notified value into the nonvolatile memory. If requested, the reception frame counter storage circuit 33 reads the frame counter value from the nonvolatile memory and provides the readout value to the reception frame counter 35.

The reception frame counter 35 is a circuit holding a frame counter. When the frame counter check circuit 36 notifies a frame counter value to the reception frame counter 35, the reception frame counter 35 holds the notified value. If requested, the reception frame counter 35 notifies the held value.

Furthermore, the reception frame counter 35 provides a frame counter value to the reception frame counter storage circuit 33 to be stored therein with each appropriate increment. Examples of the appropriate increment is as follows: 1) every time the frame counter check circuit 36 notifies the reception frame counter 35 of the frame counter values a predetermined number of times, for example, 100 times; 2) every time a difference between a value stored in the reception frame counter storage circuit 33 and a value notified from the frame counter check circuit 36 exceeds a predetermined range (typically, every time the difference exceeds a stored-frame-counter updating increment U of the reception device 200); 3) every time the reception device 200 is powered ON or OFF; 4) every time a predetermined time period has passed since recording of a frame counter value onto the reception frame counter storage circuit 33, more specifically, every time the predetermined time period has passed since recording of a frame counter value onto the reception frame counter storage circuit 33 and the frame counter check circuit 36 notifies the reception frame counter 35 of the frame counter value; and the like.

When the pairing circuit 37 notifies the reception frame counter 35 of that pairing is successful, the reception frame counter 35 sets the held frame counter value to be 0. At the same time, the reception frame counter 35 sets the frame counter value stored in the reception frame counter storage circuit 33 to be 0. More specifically, the reception frame counter 35 provides the frame counter value of 0 to the reception frame counter storage circuit 33 so that the frame counter value stored in the reception frame counter storage circuit 33 is changed to be 0.

When the reset detection circuit 34 notifies the reception frame counter 35 of reset, the reception frame counter 35 reads a frame counter value from the reception frame counter storage circuit 33 and sets the readout frame counter value.

The frame counter check circuit 36 checks a frame counter value of a received packet, and determines whether or not the frame counter value is valid. If it is determined that the packet is valid, the frame counter check circuit 36 provides the frame counter value of the packet to the reception frame counter 35. More specifically, the frame counter check circuit 36 reads a frame counter value from the reception frame counter 35, and compares the readout value to the frame counter value of the received packet. If the frame counter value of the received packet is equal to or smaller than the frame counter value of the reception frame counter 35, the frame counter check circuit 36 discards the received packet. Otherwise, the frame counter check circuit 36 provides the received packet to the MIC check circuit 39. When the MIC check circuit 39 confirms a consistency of the packet, the frame counter check circuit 36 provides the frame counter value of the packet to the reception frame counter 35.

The MIC check circuit 39 checks a consistency of the packet provided from the frame counter check circuit 36, using the key accumulated in the key accumulation circuit 38.

If the consistency of the provided packet is confirmed, the MIC check circuit 39 provides the packet to the decryption circuit 40 and also notifies the frame counter check circuit 36 of that the consistency of the packet is confirmed.

The decryption circuit 40 decrypts a payload of the packet provided from the MIC check circuit 39, using the key accumulated in the key accumulation circuit 38. The decryption circuit 40 provides the decrypted packet to the packet sorting circuit 41.

The packet sorting circuit 41 receives a packet from the packet filter 32 or the decryption circuit 40. If the received packet is a pairing request packet, the packet sorting circuit 41 sorts the received packet to the pairing circuit 37. Only if the received packet is a command packet and is encrypted and a consistency of the received packet is confirmed, the packet sorting circuit 41 sorts the packet to the tuner 42.

The tuner 42 receives a command packet from the packet sorting circuit 41. The tuner 42 operates a function such as power supply, channel selection, sound volume adjustment or the like instructed by the received command packet, and causes the display device 43 to display a demodulated TV program.

When the pairing circuit 37 receives a pairing request packet, the pairing circuit 37 newly generates a key and accumulates the key in the key accumulation circuit 38. In addition, the pairing circuit 37 generates a pairing response packet in response to the pairing request packet, and provides the generated pairing response packet to the modulation/demodulation circuit 31. Here, the pairing response packet includes the key generated by the pairing circuit 37. Furthermore, when the pairing circuit 37 generates a pairing response packet and provides the generated pairing response packet to the modulation/demodulation circuit 31, the pairing circuit 37 notifies the reception frame counter 35 of that pairing is successful. Thereby, the reception frame counter 35 resets the held frame counter value to be 0.

Thus, the reception device 200 according to the first embodiment has the above-described structure.

Next, the description is given for characteristic processing performed by the transmission device 100 having the above-described structure.

Figure 7:
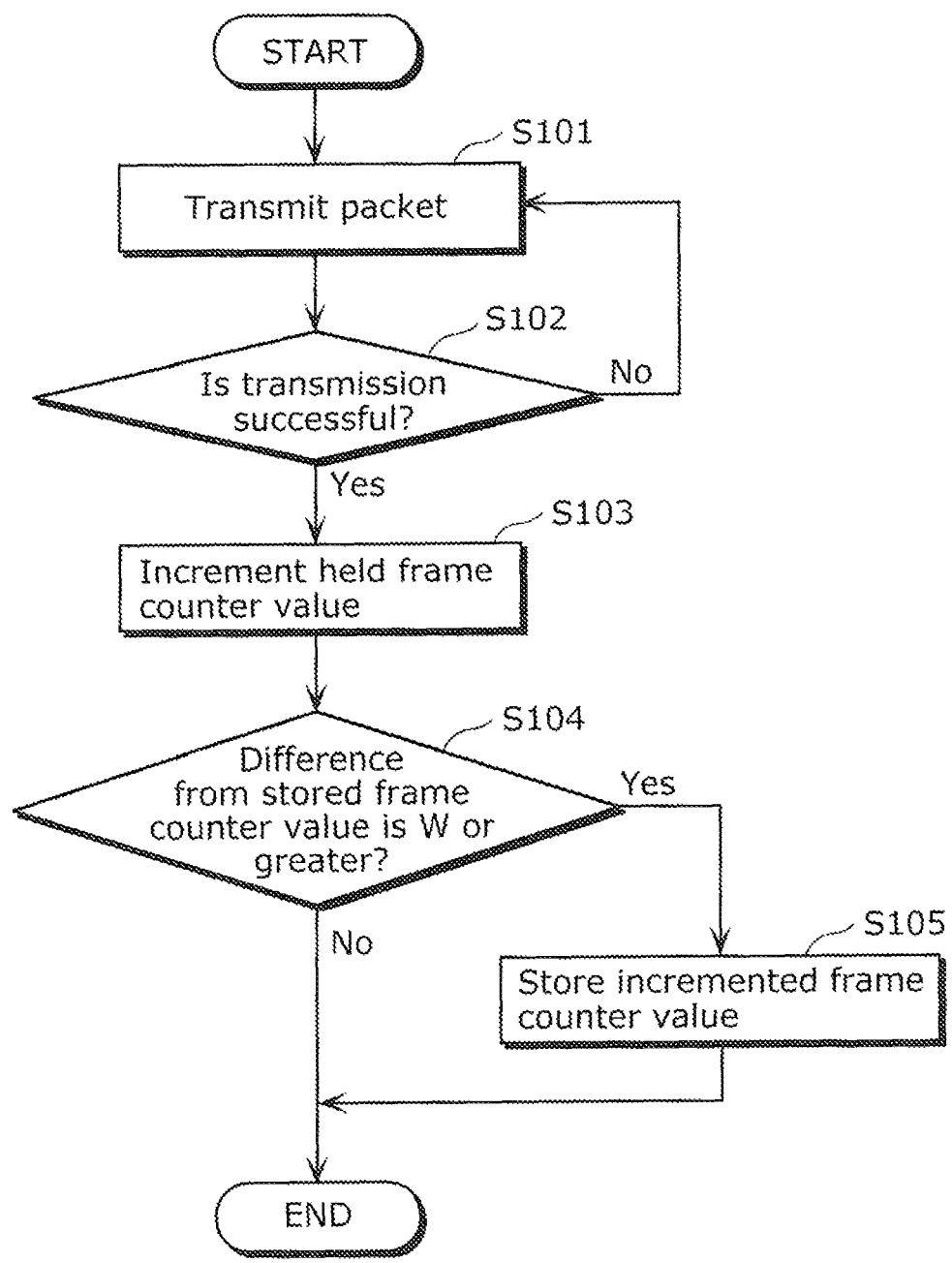
FIG. 7 is a flowchart of characteristic processing performed by the transmission device according to the first embodiment of the present invention.
Figure 8:
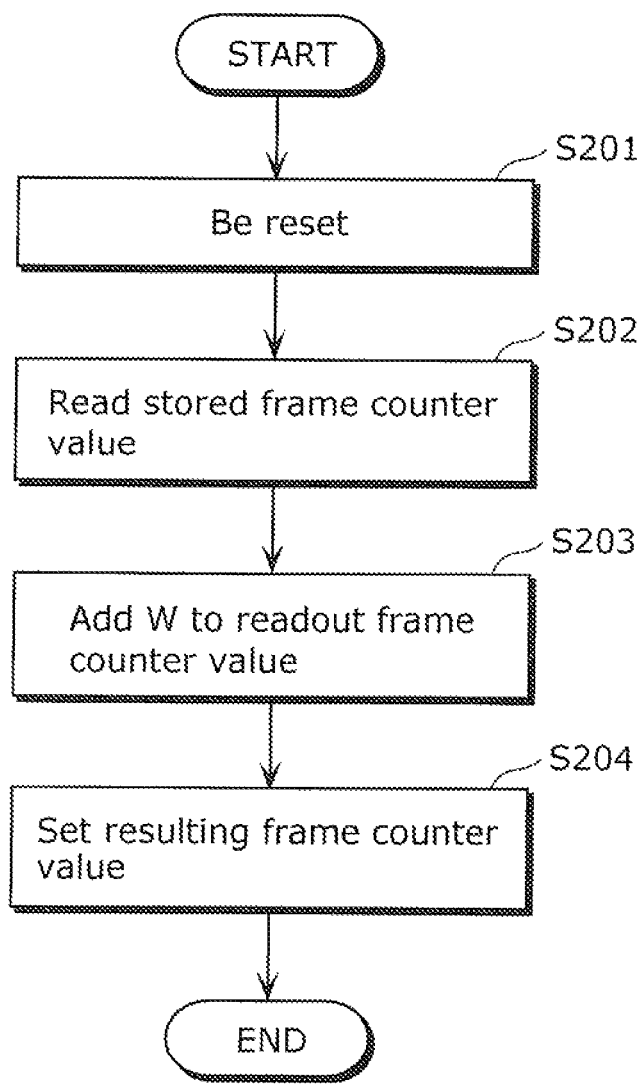
FIG. 8 is a flowchart of another characteristic processing performed by the transmission device according to the first embodiment of the present invention.

Each of FIGS. 7 and 8 is a flowchart of characteristic processing performed by the transmission device according to the first embodiment. FIG. 7 explains processing of the transmission device 100 in normal situation, while FIG. 8 explains processing of the transmission device 100 when the transmission device 100 is reset.

The following describes the processing of the transmission device 100 in normal situation with reference to FIG. 7.

It is assumed in FIG. 7 that the transmission device 100 have previously exchanged a key with the reception device 200 using a method such as pairing. Hereinafter, the description is given for the normal processing by which the transmission device 100 generates a command packet using the key obtained by the method such as pairing, and transmits the command packet to the reception device 200.

First, the transmission device 100 adds a frame counter value (represented as FC in FIG. 7) held in the transmission frame counter 20 into a packet, and transmits the resulting packet to the reception device 200 (S101).

In more detail, the transmission device 100 generates the command packet to be transmitted to the reception device 200, in the following manner. First, when a user presses a button in the button matrix 16, a command corresponding to the pressed button is outputted to the packet assembly circuit 17. Next, the packet assembly circuit 17 encrypts the command in the encryption circuit 19. Here, a frame counter value held in the counter 20A in the transmission frame counter 20 is provided to the header generation circuit 18. The header generation circuit 18 adds the frame counter value to a header packet. Next, the packet assembly circuit 17 reads the packet including the frame counter value from the header generation circuit 18. Then, the header packet is added with the command encrypted by the encryption circuit 19 and MIC generated by the MIC generation circuit 22. As a result, a command packet is generated. Thereby, the transmission device 100 generates the command packet.

Next, after transmitting the command packet to the reception device 200, the transmission device 100 determines whether or not the transmission of the packet is successful (S102). In more detail, the transmission device 100 make the above determination, by determining whether or not the transmission device 100 receives an acknowledgement packet of the packet transmitted to the reception device 200.

If the transmission of the packet is not successful (No at S102), in other words, if an acknowledgement packet is not received from the reception device 200 in response to the transmitted packet, then the transmission device 100 re-transmits the transmitted packet to the reception device 200. Then, the above processing repeats until the transmission of the packet becomes successful.

On the other hand, if the transmission of the packet is successful (Yes at S102), in other words, if an acknowledgement packet is received from the reception device 200 in response to the transmitted packet, then the transmission device 100 increments the frame counter value held in the transmission frame counter 20 by 1 (S103).

Here, the transmission device 100 compares (a) the frame counter value incremented by 1 by the transmission frame counter 20 to (b) the frame counter value stored in the transmission frame counter storage circuit 23, in order to determine whether or not a difference between these frame counter values is equal to or greater than the stored-frame-counter updating increment W (S104).

If the difference is equal to or greater than the stored-frame-counter updating increment W (Yes at S104), then the transmission device 100 stores the frame counter value incremented by 1 by the transmission frame counter 20 into the transmission frame counter storage circuit 23, and then completes the processing. Here, the transmission frame counter storage circuit 23 needs to hold only the frame counter value incremented by 1 by the transmission frame counter 20. In other words, the transmission frame counter storage circuit 23 does not need to keep any previous values, so that the incremented frame counter value is overwritten in the transmission frame counter storage circuit 23 to be stored.

On the other hand, if the difference is neither equal to nor greater than the stored-frame-counter updating increment W (No at S104), then the transmission device 100 terminates the processing.

The transmission device 100 performs the processing in normal situation in the above-described manner.

Next, the following describes the processing performed when the transmission device 100 is reset with reference to FIG. 8.

Firstly, it is assumed that the transmission device 100 is reset (S201). More specifically, it is assumed in the transmission device 100 that a frame counter value held in the transmission frame counter 20 is cleared.

Therefore, the transmission device 100 reads a frame counter value from the transmission frame counter storage circuit 23 (S202). In more detail, in the transmission device 100, the reset detection circuit 24 notifies the controller 20C in the transmission frame counter 20 of that the reset is detected. In response to the notification, the controller 20C controls the adder 20B to read the frame counter value from the transmission frame counter storage circuit 23.

Next, the transmission device 100 adds the stored-frame-counter updating increment W to the readout frame counter value (S203), and thereby sets the resulting value to be the frame counter value to be held in the transmission frame counter (S204). More specifically, in the transmission device 100, the adder 20B adds the stored-frame-counter updating increment W to the readout frame counter value, and provides the resulting value to the counter 20A. Then, the controller 20C controls the counter 20A to set a new frame counter value to be held in the counter 20A as the value outputted by the adder 20B.

The transmission device 100 performs the processing when the transmission device 100 is reset, in the above-described manner.

Next, pairing is described as an example of methods for exchanging a key between the transmission device 100 and the reception device 200 to be used by them.

First, in the transmission device 100, when the user presses the pairing button 13, the pairing circuit 14 generates a pairing request packet; and transmits, to the reception device 200, the pairing request packet that is a plain-text and broadcast packet.

Then, in receiving the pairing request packet, the reception device 200 provides the received pairing request packet eventually to the pairing circuit 37. Here, the pairing circuit 37 generates a new key and accumulates the generated key into the key accumulation circuit 38, and also sets each of the frame counter value held in the reception frame counter 35 and the frame counter value stored in the reception frame counter storage circuit 33 to be 0. Then, the pairing circuit 37 generates a pairing response packet including the generated key and transmits the pairing response packet to the transmission device 100.

Next, the pairing circuit 14 in the transmission device 100 receives the pairing response packet. Here, the transmission device 100 retrieves the key from the pairing response packet and accumulates the key into the key accumulation circuit 21, and resets the frame counter value held in the transmission frame counter 20 and the frame counter value stored in the transmission frame counter storage circuit 23 to be 0.

As described above, the transmission device 100 and the reception device 200 exchange a key using the pairing.

As mentioned earlier, the key exchange method is not limited to the pairing as far as the key to be used for a command packet transmitted to the reception device 200 can be exchanged between the transmission device 100 and the reception device 200.

Next, how to transmit and receive a command packet between the transmission device 100 and the reception device 200 is explained.

First, in the transmission device 100, when the user presses a button in the button matrix 16, a command corresponding to the pressed button is provided to the packet assembly circuit 17. The packet assembly circuit 17 encrypts the command, and adds a header and MIC to the encrypted command to generate a command packet. The command packet is transmitted to the reception device 200. Here, a frame counter value held in the transmission frame counter 20 is used as a frame counter value included in the header. The frame counter value is incremented by 1, when an acknowledgement packet is received from the reception device 200.

When the reception device 200 receives the command packet, the frame counter check circuit 36 in the reception device 200 confirms the frame counter value in the received command packet. The received packet is accepted, only when the frame counter check circuit 36 confirms that the frame counter value in the received packet is greater than a frame counter value held in the reception frame counter 35. When the received packet is accepted, the MIC check circuit 39 also checks a consistency of the MIC. If the consistency of the MIC is correct, the packet is decrypted and the command is executed.

In the above description, if the consistency of the MIC is confirmed, the frame counter value included in the packet is held in the reception frame counter 35 as a new value.

As described above, when a command packet is transmitted and received between the transmission device 100 and the reception device 200, the frame counter value held in the transmission device 100 is incremented by 1 and the frame counter value held in the reception device 200 is also monotonically incremented.

Figure 9:
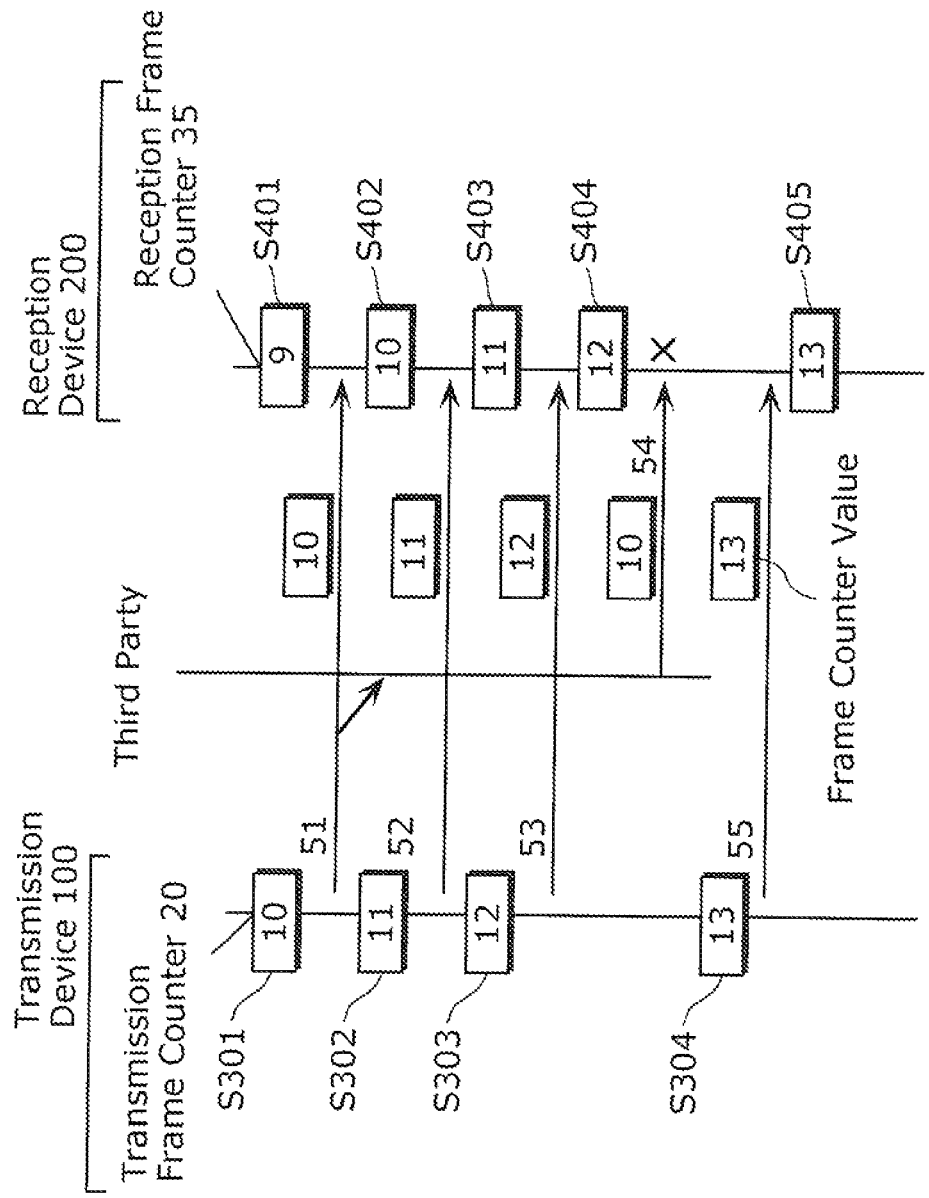
FIG. 9 is a sequence diagram for explaining why the transmission device and the reception device can block a reproduction attack from a third party, according to the first embodiment of the present invention.

Next, the following describes how the transmission device 100 and the reception device 200 according to the first embodiment of the present invention block a replay attack from a third party, with reference to FIG. 9.

FIG. 9 is a sequence diagram for explaining why the transmission device 100 and the reception device 200 can block a replay attack from a third party, according to the first embodiment of the present invention.

FIG. 9 illustrates a situation where the transmission device 100 transmits command packets 51, 52, 53, and 55 to the reception device 200. The transmission device 100 adds the frame counter value held in the transmission frame counter 20 to a command packet, and transmits the resulting command packet to the reception device 200. In the initial state illustrated in FIG. 9, it is assumed that the frame counter value held in the transmission frame counter 20 is 10, and that the frame counter value held in the reception frame counter 35 is 9 that is less than 10 by 1.

First, at each step of S301 to S303, the transmission device 100 increments the frame counter value held in the transmission frame counter 20 by 1, every time a command packet among the command packets 51 to 53 is transmitted and then received. On the other hand, at each step of S401 to S404, the reception device 200 sets the frame counter value held in the reception frame counter 35 as the value included in the command packet received from the transmission device 100.

Here, it is assumed that a third party, who is near the transmission device 100 and the reception device 200, captures the command packet 51 and transmits the captured packet 51 as a command packet 54 to the reception device 200 at Step S404, namely, the third party executes a replay attack.

Under the assumption, in the reception device 200, the frame counter value held in the reception frame counter 35 is 12 that is greater than 10 that is the frame counter value indicated in the command packet 54. Therefore, the reception device 200 discards the command packet 54. As a result, the attack from the third party fails.

Next, at S304, the transmission device 100 transmits the command packet 55 to the reception device 200. The reception device 200 accepts the command packet 55 that is a correct packet. This is because the frame counter value held in the reception device 200 is not changed to the value in the command packet 54 transmitted from the third party.

In the above-described manner, the transmission device 100 and the reception device 200 according to the first embodiment of the present invention can block a replay attack from a third party.

Next, the processing performed when the transmission device 100 or the reception device 200 according to the first embodiment is reset is described with reference to a sequence diagram.

Figure 10:
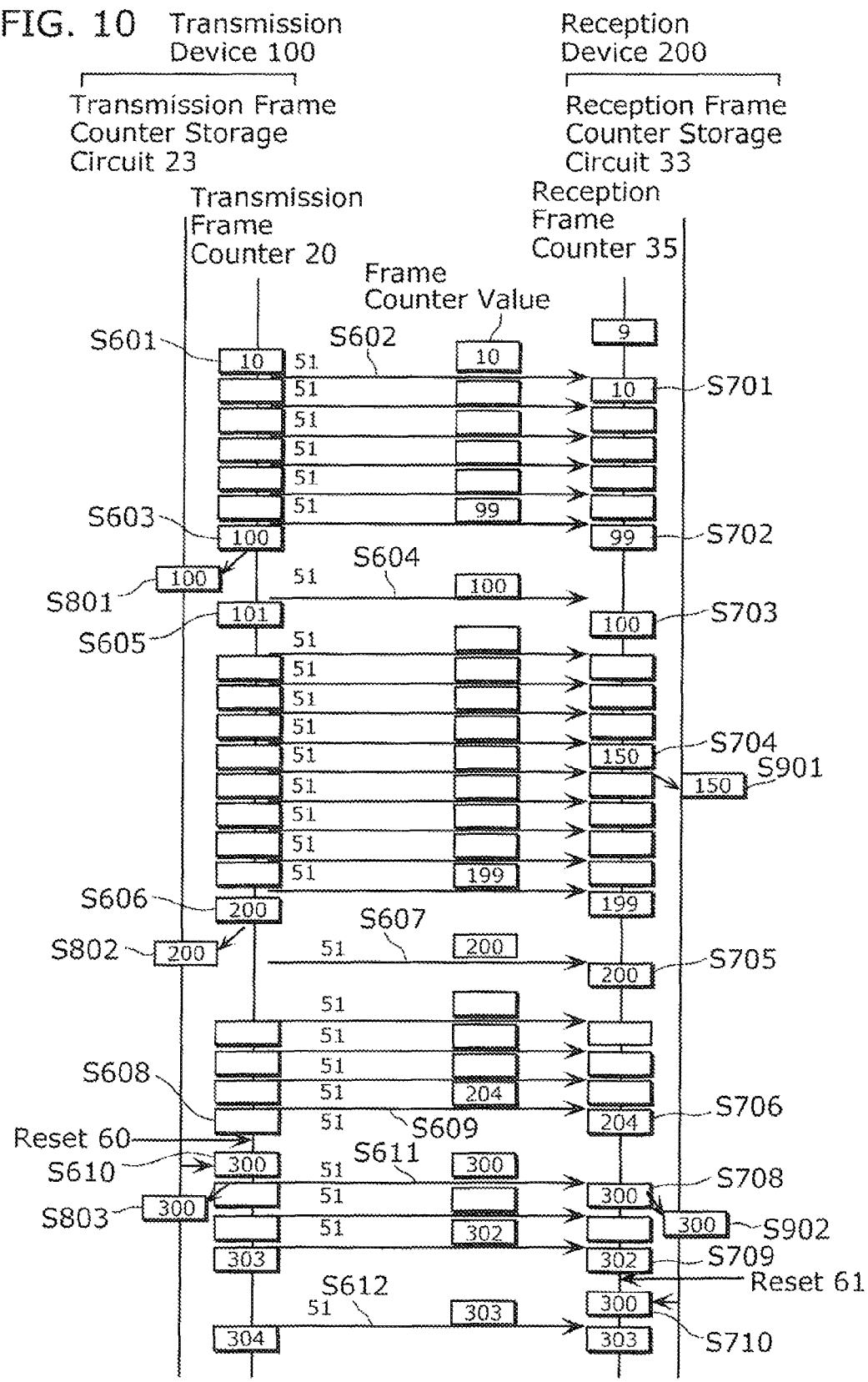
FIG. 10 is a sequence diagram of processing performed when the transmission device or the reception device is reset according to the first embodiment of the present invention.

FIG. 10 is a sequence diagram of processing performed when the transmission device 100 or the reception device 200 is reset according to the first embodiment. Hereinafter, it is assumed that the stored-frame-counter updating increment W for the transmission device 100 is 100, and that the stored-frame-counter updating increment U for the reception device 200 is 150.

As illustrated in FIG. 10, the transmission device 100 increments the frame counter value held in the transmission frame counter 20 by 1, every time the transmission device 100 transmits a command packet (for example, each of command packets 51) to the reception device 200 (S601 to S609). On the other hand, the reception device 200 sets the frame counter value held in the reception frame counter 35 as the frame counter value included in the received packet, every time the reception device 200 receives a correct packet from the transmission device 100 (S701 to S706).

Then, in the transmission device 100, every time a remainder of diving the frame counter value held in the transmission frame counter 20 by the stored-frame-counter updating increment W is 0, in other words, every time the frame counter value held in the transmission frame counter 20 is incremented by 100, the transmission device 100 stores the frame counter value into the transmission frame counter storage circuit 23 (S801, S802). On the other hand, in the reception device 200, every time the frame counter value included in the packet received from the transmission device 100 becomes multiples of 150, the reception device 200 stores the frame counter value into the reception frame counter storage circuit 33 (S901).

Here, at S608, it is assumed that the transmission device 100 is reset.

Therefore, in the transmission device 100, the transmission frame counter 20 reads a frame counter value from the transmission frame counter storage circuit 23, and sets the readout frame counter value added with the stored-frame-counter updating increment W of 100, to be a new frame counter value to be held in the transmission frame counter 20 (S610). More specifically, a value of 300, which is the frame counter value of 200 stored in the transmission frame counter storage circuit 23 added with a value of 100, is set as a new frame counter value in the transmission frame counter 20. Therefore, when the transmission device 100 transmits a next packet to the reception device 200, the next packet includes the value of 300 (S611).

At S610, in the transmission device 100, a difference between (a) the frame counter value currently held in the transmission frame counter 20 and (b) the frame counter value stored in the transmission frame counter storage circuit 23 exceeds the stored-frame-counter updating increment W of 100. Therefore, the transmission frame counter 20 updates the frame counter value of 200 stored in the transmission frame counter storage circuit 23, to the current frame counter value of 300 (S803).

On the other hand, in the reception device 200, when the transmission device 100 is reset, the frame counter value held in the reception frame counter 35 is 204 (S706). When the reception device 200 receives a next packet from the reset transmission device 100, a frame counter value included in the received packet is 300 that is greater than 204. Therefore, the reception device 200 accepts the frame counter value of 300 included in the received packet, and updates the frame counter value held in the reception frame counter 35 to be 300 (S708).

Furthermore, in the reception device 200, a difference between (a) the frame counter value currently held in the reception frame counter 35 and (b) the frame counter value stored in the reception frame counter storage circuit 33 exceeds the stored-frame-counter updating increment U of 150. Therefore, the reception frame counter 35 updates the frame counter value of 150 stored in the reception frame counter storage circuit 33, to the current frame counter value of 300 (S902).

In the above-described manner, the frame counter values of the transmission device 100 and the reception device 200 have a consistency even if the transmission device 100 is reset.

As described above, when the transmission device 100 is reset, the frame counter value held in the transmission frame counter 20 is set to a value (for example, 300) that is the frame counter value (for example, 200) stored in the transmission frame counter storage circuit 23 added with the stored-frame-counter updating increment W (for example, 100).

Here, the frame counter value lost in the transmission frame counter 20 ranges from 200 to 300, for example. In other words, the frame counter value lost in the transmission frame counter 20 is within a value that is the frame counter value stored in the transmission frame counter storage circuit 23 added with the stored-frame-counter updating increment W. As described above, the transmission device 100 according to the first embodiment adds the stored-frame-counter updating increment W to the frame counter value stored in the transmission frame counter storage circuit 23 in order to reconstruct the frame counter value held in the transmission frame counter 20 to have a possible maximum value.

This value, namely, a possible maximum value of the frame counter value held in the transmission frame counter 20, is greater than the frame counter value held in the reception frame counter 35 in the reception device 200. Therefore, packet communication can be established between the transmission device 100 and the reception device 200. In addition, the frame counter value is updated in each of the devices so that the frame counters in both devices operate in synchronization with each other.

Next, the situation where the reception device 200 is reset is described. Here, at S709, it is assumed that the reception device 200 is reset. More specifically, it is assumed that the reception device 200 is reset when the frame counter value held in the reception frame counter 35 is 302 and the frame counter value stored in the reception frame counter storage circuit 33 is 300.

In the situation, in the reception device 200, the reception frame counter 35 reads the frame counter value of 300 from the reception frame counter storage circuit 33, and sets the frame count value to be held in the reception frame counter 35, as the readout value of 300 (S710).

Next, the transmission device 100 transmits a packet to the reception device 200 (5612). As indicated at S612, the frame counter value included in the packet transmitted from the transmission device 100 is greater than 300. Therefore, the reception device 200 accepts a packet received from the transmission device 100 at and after S710.

In the above-described manner, the frame counters in the transmission device 100 and the reception device 200 are in synchronization with each other even if the reception device 200 is reset.

As described above, even if the transmission device 100 or the reception device 200 is reset, the transmission device 100 and the reception device 200 according to the first embodiment can keep a consistency between their frame counter values. As a result, it is not necessary to re-perform key sharing such as pairing, and it is therefore not bothersome. Thus, the transmission device 100 is useful as a device, such as a remote controller, requiring a high speed response.

In the transmission device 100 according to the first embodiment, the frame counter value is stored into the transmission frame counter storage circuit 23 for each stored-frame-counter updating increment W, not for each packet transmission. Therefore, a number of processes for writing to the transmission frame counter storage circuit 23 can be decreased. For example, the transmission device 100 can reduce a number of processes for writing to a nonvolatile memory such as a flash memory capable of being embedded in the small transmission device such as a remote controller. Therefore, a practical life of the nonvolatile memory can be provided.

Thus, the first embodiment of the present invention can provide a transmission device, a reception device, a transmission method, a reception method, and a transmission/reception system, each of which is capable of continuing secure communication having a consistency between a frame counter of the transmission device and a frame counter of the reception device without bothering a user, even if the frame counter is reset due to battery exchange, power cut off, or the like.

It should be noted that it has been described that the transmission device 100 transmits a packet to the reception device 200 via a wireless communication path, but the present invention is not limited to the above and the transmission device 100 may transmit a packet via a wired communication path. In the above case, the transmission device 100 and the reception device 200 may receive not radio waves but signals so that a packet can be received via a wired communication path.

It should also be noted that the nonvolatile memory is typically a flash memory, but is not limited to that. For example, any nonvolatile memory may be used as far as it can be embedded in the small transmission device 100 such as a remote controller.

It should also be noted that it has been described that the transmission device 100 increments the held frame counter value by 1, but the present invention is not limited to this. Any method is possible as far as the held frame counter value is monotonically incremented to be held.

It should also be noted that the stored-frame-counter updating increment W or U is not limited to the above-described value. The value may be anything equal to or less than a value of 1024 that is defined by the standard described in Non-Patent Reference 1.

It should also be noted that it has been described as a preferable example that, in the transmission device 100, when the transmission device 100 is reset, the value stored in the transmission frame counter storage circuit 23 added with the stored-frame-counter updating increment W is rewritten (held) as a frame counter value to the transmission frame counter 20. However, the present invention is not limited to the above. Instead of the stored-frame-counter updating increment W, a value greater than the stored-frame-counter updating increment may be added to the value stored in the transmission frame counter storage circuit 23. In this case, the same effects can be provided.

It should also be noted that it has been described that an example of the transmission device 100 is a remote controller and an example of the reception device 200 is a TV. However, the present invention is not limited to the above. Any devices requiring secure communication at a high response can be used as the devices. For example, of course, a high-function remote controller may be the reception device 200 according to the first embodiment, and a TV may be the transmission device 100.

Second Embodiment

The following describes the second embodiment of the present invention.

Figure 11:
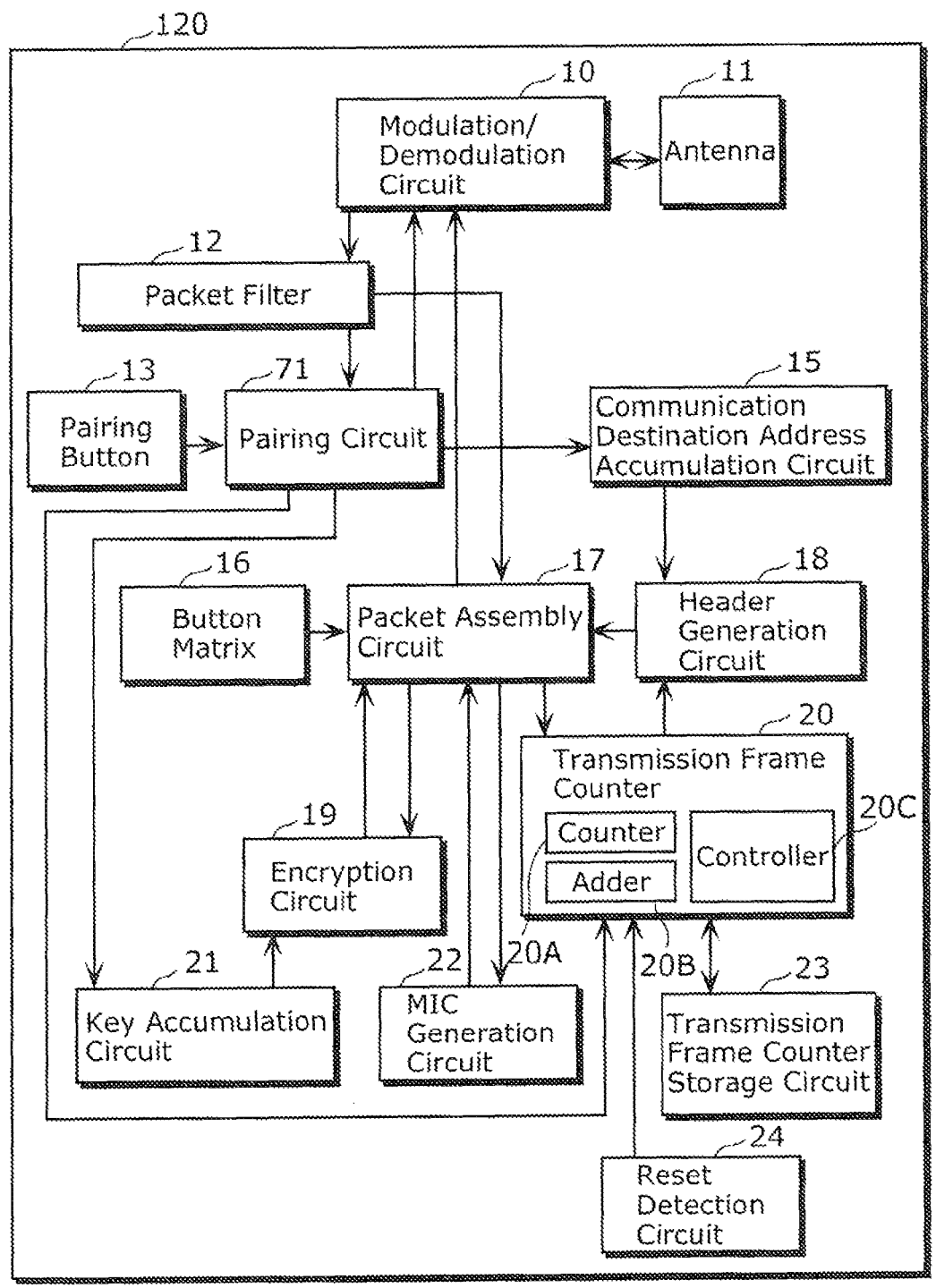
FIG. 11 is a block diagram of a structure of a transmission device according to a second embodiment of the present invention.
Figure 12:
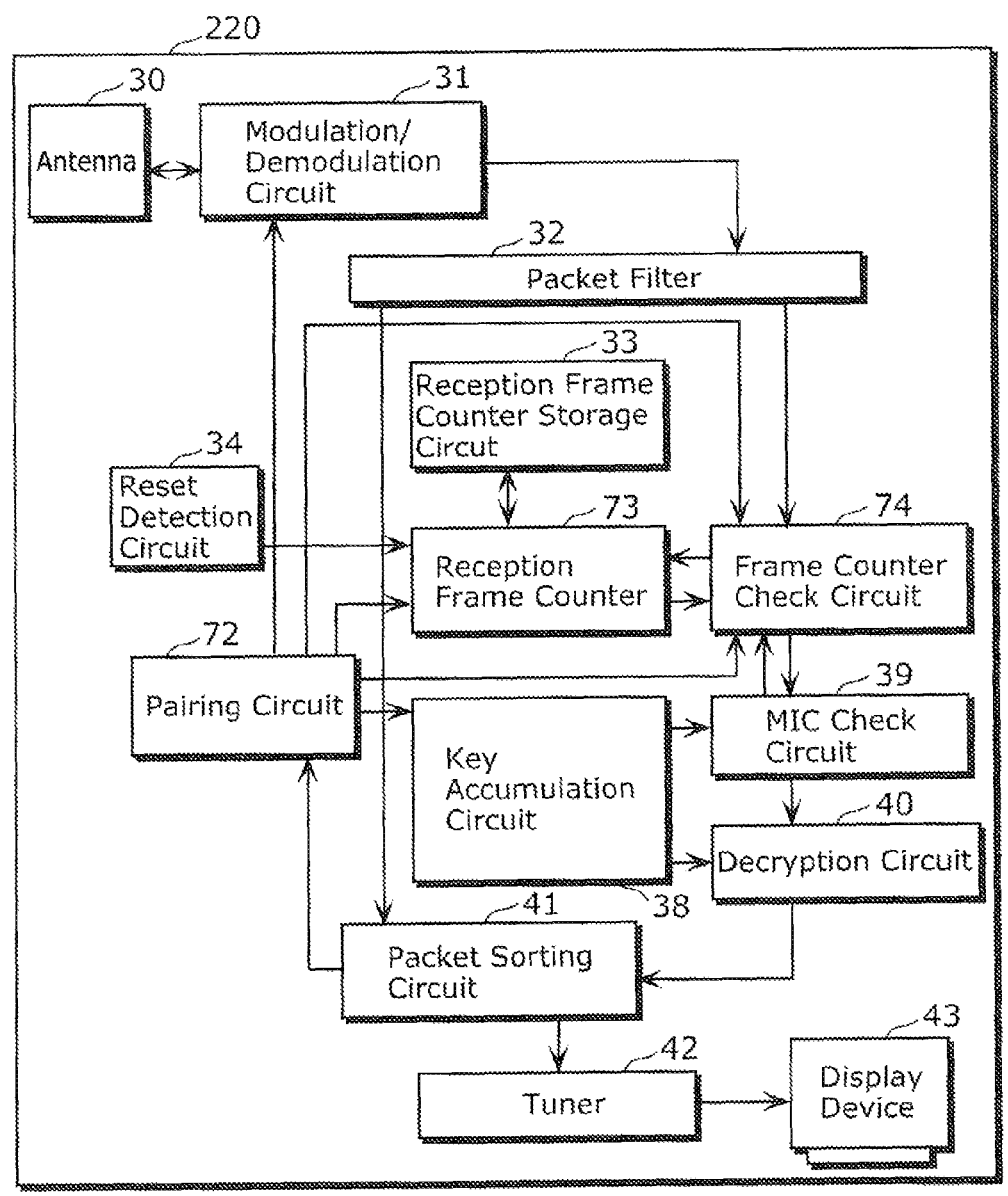
FIG. 12 is a block diagram of a structure of a reception device according to the second embodiment of the present invention.

FIG. 11 is a block diagram of a structure of the transmission device according to the second embodiment. FIG. 12 is a block diagram of a structure of the reception device according to the second embodiment. Here, the same reference numerals of FIGS. 5 and 6 are assigned to the identical units of FIGS. 11 and 12, so that the identical units are not explained again below.

The transmission device 120 illustrated in FIG. 11 differs from the transmission device 100 according to the first embodiment in that the pairing circuit 14 is replaced by a pairing circuit 71. In addition, the reception device 220 illustrated in FIG. 12 differs from the reception device 200 according to the first embodiment in that the pairing circuit 37 is replaced by a pairing circuit 72, the reception frame counter 35 is replaced by a reception frame counter 73, and the frame counter check circuit 36 is replaced by a frame counter check circuit 74.

In the transmission device 120, the pairing circuit 71 has a following function in addition to the function of the pairing circuit 14. When the pairing button 13 is pressed, the pairing circuit 71 generates a pairing request packet and adds a value of the stored-frame-counter updating increment W into the pairing request packet.

On the other hand, in the reception device 220, the pairing circuit 72 has the function of the pairing circuit 37, and also notifies the reception frame counter 73 with the stored-frame-counter updating increment W included in a received pairing request packet. In addition, the pairing circuit 72 provides the value of the stored-frame-counter updating increment W to the frame counter check circuit 74.

The reception frame counter 73 holds a frame counter value and also the value notified as the stored-frame-counter updating increment W.

In addition to the function of the frame counter check circuit 36, the frame counter check circuit 74 has another function of discarding a received packet if a frame counter value indicated in the packet is equal to or greater than the value held in the reception frame counter 73 added with the stored-frame-counter updating increment W.

Thus, the transmission device 120 and the reception device 220 have the above-described structures.

Therefore, the reception device 220 accepts only packets each having a frame counter value that is greater than the value held in the reception frame counter 73 and is equal to or smaller than the stored-frame-counter updating increment W. This makes it possible to reduce malicious attacks from a third party more than the first embodiment where all packets each having a frame counter value greater than a value held in the reception frame counter 73 are accepted.

Thus, the present invention can provide a transmission device, a reception device, a transmission method, a reception method, and a transmission/reception system, each of which is capable of continuing secure communication having a consistency between a frame counter of the transmission device and a frame counter of the reception device without bothering a user, even if the frame counter is reset due to battery exchange, power cut off, or the like.

Although the embodiments of the transmission device, the reception device, the transmission method, the reception method, and the transmission/reception system according to the present invention have been described above, those skilled in the art will be readily appreciate that the present invention is not limited to the embodiments. Various modifications in the embodiments and combinations of the structural elements in the different embodiments are possible and included within the scope of the present invention, without materially departing from the novel teachings and advantages of the present invention.

INDUSTRIAL APPLICABILITY

The present invention can be used as a transmission device, a reception device, a transmission method, a reception method, and a transmission/reception system. Especially, the present invention can be used as a transmission device, a reception device, a transmission method, a reception method, and a transmission/reception system regarding, for example, a remote controller that needs battery exchange and controls a device such as a TV, and the controlled device.

NUMERICAL REFERENCES 10, 31 modulation/demodulation circuit
11, 30 antenna
12, 32 packet filter
13 pairing button
14, 37, 71, 72 pairing circuit
15 communication destination address accumulation circuit
16 button matrix
17 packet assembly circuit
18 header generation circuit
19 encryption circuit
20 transmission frame counter
21, 38 key accumulation circuit
22 MIC generation circuit
23 transmission frame counter storage circuit
24 reset detection circuit
33 reception frame counter storage circuit
34 reset detection circuit
35, 73 reception frame counter
36, 74 frame counter check circuit
39 MIC check circuit
40 decryption circuit
41 packet sorting circuit
42 tuner
43 display device
100, 120 transmission device
200, 220 reception device

The invention claimed is:

1. A transmission device which transmits a packet to a reception device, said transmission device comprising:
   a transmission frame counter unit configured to increment a value every time a packet is generated, and to hold the incremented value as a frame counter value each time the value is incremented; and
   a transmission unit configured to add the frame counter value held in said transmission frame counter unit to the packet, and to transmit the packet to the reception device,
   wherein, when said transmission device is reset, a new frame counter value is generated based on the frame counter value held in said transmission frame counter unit, such that the new frame counter value is greater than the frame counter value held in said transmission frame counter unit by a predetermined value and such that the new frame counter value is held in said transmission frame counter unit.

2. The transmission device according to claim 1, further comprising a storage unit configured to store a value,
   wherein said transmission frame counter unit is further configured to
   (i) store the frame counter value counted and held in said transmission frame counter unit into said storage unit for each stored-frame-counter updating increment, the stored-frame-counter updating increment being a natural number greater than an increment by which the frame counter value is incremented, and
   (ii) generate and hold, as the new frame counter value, a value that is generated by adding the stored-frame-counter updating increment to the frame counter value stored in said storage unit.

3. The transmission device according to claim 2, wherein said transmission frame counter unit includes a nonvolatile memory.

4. The transmission device according to claim 1, wherein said storage unit is a nonvolatile memory.

5. The transmission device according to claim 1, wherein said transmission unit is configured to transmit the packet to the reception device via a wireless communication path.

6. The transmission device according to claim 1, wherein said transmission device is a remote controller.

7. A reception device comprising:
   a reception unit configured to receive, from a transmission device, a packet including a frame counter value;
   a frame counter check unit configured to check the frame counter value included in the packet received by said reception unit so as to determine whether or not the frame counter value is valid; and
   a reception frame counter unit configured to hold the frame counter value determined by said frame counter check unit as being valid,
   wherein said frame counter check unit is configured to determine that the frame counter value included in the packet received by said reception unit is valid, when the frame counter value included in the packet is greater than the frame counter value held in said reception frame counter unit,
   wherein the transmission device includes:
   a transmission frame counter unit configured to increment a value every time the packet is generated, and to hold the incremented value as the frame counter value each time the value is incremented; and
   a transmission unit configured to add the frame counter value held in the transmission frame counter unit to the packet, and to transmit the packet to the reception device, and
   wherein, when the transmission device is reset, a new frame counter value is generated based on the frame counter value held in the transmission frame counter unit, such that the new frame counter value is greater than the frame counter value held in the transmission frame counter unit by a predetermined value, such that the new frame counter value is held in the transmission frame counter unit and such that the new frame counter value is added to the packet transmitted by the transmission unit and received by said reception unit.

8. The reception device according to claim 7, wherein said frame counter check unit is configured to discard the packet received by said reception unit, when said frame counter check unit determines that the frame counter value included in the packet received by said reception unit is not valid.

9. The reception device according to claim 7, further comprising a reception frame counter storage unit configured to store, by each predetermined increment, the frame counter value determined as being valid.

10. The reception device according to claim 9, wherein the predetermined increment is an increment during which said reception device receives U packets from the transmission device, where U is a natural number of 2 or greater.

11. The reception device according to claim 9,
wherein the predetermined increment is a stored-frame-counter updating increment that is a natural number of 2 or greater and that is for the frame counter value determined as being valid, and
said reception frame counter storage unit is further configured to store the frame counter value determined as being valid, when a difference between (a) the frame counter value determined as being valid and (b) the frame counter value previously stored in said reception frame counter storage unit is equal to or greater than the stored-frame-counter updating increment.

12. The reception device according to claim 9,
wherein a frame counter updating increment for said reception device is equal to a frame counter updating increment for the transmission device, the frame counter updating increment being the each predetermined increment, and
wherein said frame counter check unit is configured to determine that the frame counter value included in the packet received by said reception unit is valid, when the frame counter value included in the packet is greater than the frame counter value held in said reception frame counter unit and is equal to or smaller than the frame counter value held in said reception frame counter unit added with the frame counter updating increment.

13. The reception device according to claim 9, wherein said reception frame counter unit is configured to read the frame counter value from said reception frame counter storage unit and to hold the frame counter value in said reception frame counter unit, when the frame counter value held in said reception frame counter unit is lost.

14. The reception device according to claim 13, wherein said reception device is a television.

15. A transmission method performed by a transmission device to transmit a packet to a reception device, said transmission method comprising:
incrementing a value every time a packet is generated;
holding, in a transmission frame counter unit of the transmission device, the incremented value as a frame counter value each time the value is incremented;
adding the frame counter value held in the transmission frame counter unit to the packet; and
transmitting the packet to the reception device,
wherein, when the transmission device is reset, a new frame counter value is generated based on the frame counter value held in the transmission frame counter unit, such that the new frame counter value is greater than the frame counter value held in the transmission frame counter unit by a predetermined value and such that the new frame counter value is held in the transmission frame counter unit.

16. A receiving method performed by a receiving device to receive a packet from a transmission device, said receiving method comprising:
receiving, from the transmission device, a packet including a frame counter value;
checking the frame counter value included in the packet received in said receiving, so as to determine whether or not the frame counter value is valid; and
holding, in a reception frame counter unit, the frame counter value determined in said checking as being valid,
wherein said checking determines that the frame counter value included in the packet received in said receiving is valid, when the frame counter value included in the packet is greater than the frame counter value held in the reception frame counter unit,
wherein the transmission device includes:
a transmission frame counter unit configured to increment a value every time the packet is generated, and to hold the incremented value as the frame counter value each time the value is incremented; and
a transmission unit configured to add the frame counter value held in the transmission frame counter unit to the packet, and to transmit the packet to the reception device, and
wherein, when the transmission device is reset, a new frame counter value is generated based on the frame counter value held in the transmission frame counter unit, such that the new frame counter value is greater than the frame counter value held in the transmission frame counter unit by a predetermined value, such that the new frame counter value is held in the transmission frame counter unit and such that the new frame counter value is added to the packet transmitted by the transmission unit and received by said receiving.

17. A transmission and reception system comprising a transmission device and a reception device,
wherein said transmission device includes:
a transmission frame counter unit configured to increment a value every time a packet is generated, and to hold the incremented value as a frame counter value each time the value is incremented; and
a transmission unit configured to add the frame counter value held in said transmission frame counter unit to the packet, and to transmit the packet to said reception device,
wherein, when said transmission device is reset, a new frame counter value is generated based on the frame counter value held in said transmission frame counter unit, such that the new frame counter value is greater than the frame counter value held in said transmission frame counter unit by a predetermined value and such that the new frame counter value is held in said transmission frame counter unit,
wherein said reception device includes:
a reception unit configured to receive the packet including the frame counter value;
a frame counter check unit configured to check the frame counter value included in the packet received by said reception unit so as to determine whether or not the frame counter value is valid; and
a reception frame counter unit configured to hold the frame counter value determined by said frame counter check unit as being valid, and
wherein said frame counter check unit is configured to determine that the frame counter value included in the packet received by said reception unit is valid, when the frame counter value included in the packet is greater than the frame counter value stored in said reception frame counter unit.

18. The transmission and reception system according to claim 17,
wherein said transmission device is a television, and said reception device is a remote controller.

* * * * *